United States Patent
Osman et al.

(10) Patent No.: US 12,431,983 B2
(45) Date of Patent: Sep. 30, 2025

(54) PERTURBATIVE-BASED NONLINEAR COMPENSATION FOR DIGITAL SUBCARRIER SYSTEMS

(71) Applicant: Infinera Corporation, San Jose, CA (US)

(72) Inventors: Mohamed Osman, Ottawa (CA); Demin Yao, Ottawa (CA); Domanic Lavery, Ottawa (CA); Han Henry Sun, Ottawa (CA); Pierre Mertz, Baltimore, MD (US)

(73) Assignee: Infinera Corporation

( * ) Notice: Subject to any disclaimer, the term of this patent is extended or adjusted under 35 U.S.C. 154(b) by 42 days.

(21) Appl. No.: 17/944,812

(22) Filed: Sep. 14, 2022

(65) Prior Publication Data

US 2023/0085546 A1    Mar. 16, 2023

Related U.S. Application Data

(60) Provisional application No. 63/243,893, filed on Sep. 14, 2021.

(51) Int. Cl.
*H04B 10/61* (2013.01)
*H04L 1/00* (2006.01)

(52) U.S. Cl.
CPC ..... *H04B 10/6163* (2013.01); *H04B 10/6161* (2013.01); *H04L 1/0045* (2013.01); *H04L 1/0067* (2013.01)

(58) Field of Classification Search
CPC ... H04B 10/58; H04B 10/588; H04B 10/6163
See application file for complete search history.

(56) References Cited

U.S. PATENT DOCUMENTS

| | | | |
|---|---|---|---|
| 2003/0180055 A1* | 9/2003 | Azadet | H04B 10/504 398/189 |
| 2004/0096222 A1* | 5/2004 | Cagenius | H04B 10/25755 398/115 |
| 2004/0213578 A1 | 10/2004 | Takahara | |
| 2006/0049870 A1 | 3/2006 | Hellberg | |
| 2012/0263456 A1 | 10/2012 | Tanaka | |
| 2014/0086356 A1 | 3/2014 | Azadet | |
| 2015/0326190 A1 | 11/2015 | Gustavsson | |
| 2023/0010592 A1* | 1/2023 | Zhang | H04B 10/58 |

* cited by examiner

*Primary Examiner* — Nathan M Cors

(57) ABSTRACT

Methods, systems, and apparatus, including computer programs encoded on computer storage media, for applying non-linearity to digital subcarriers. A receiver includes a detector circuit operable to receive a first optical signal over an optical link, the first optical signal carrying first data. The receiver includes a carrier recovery estimation circuit operable to generate compensated data by correcting errors in the first data. The receiver includes a non-linear coefficient estimation circuit operable to (i) receive the compensated data, and (ii) estimate one or more non-linear coefficients, wherein information indicative of the estimated non-linear coefficients is transmitted over an optical network, such that a second optical signal is transmitted based, at least in part, on the estimated non-linear coefficients, the second optical signal being received by the receiver.

15 Claims, 20 Drawing Sheets

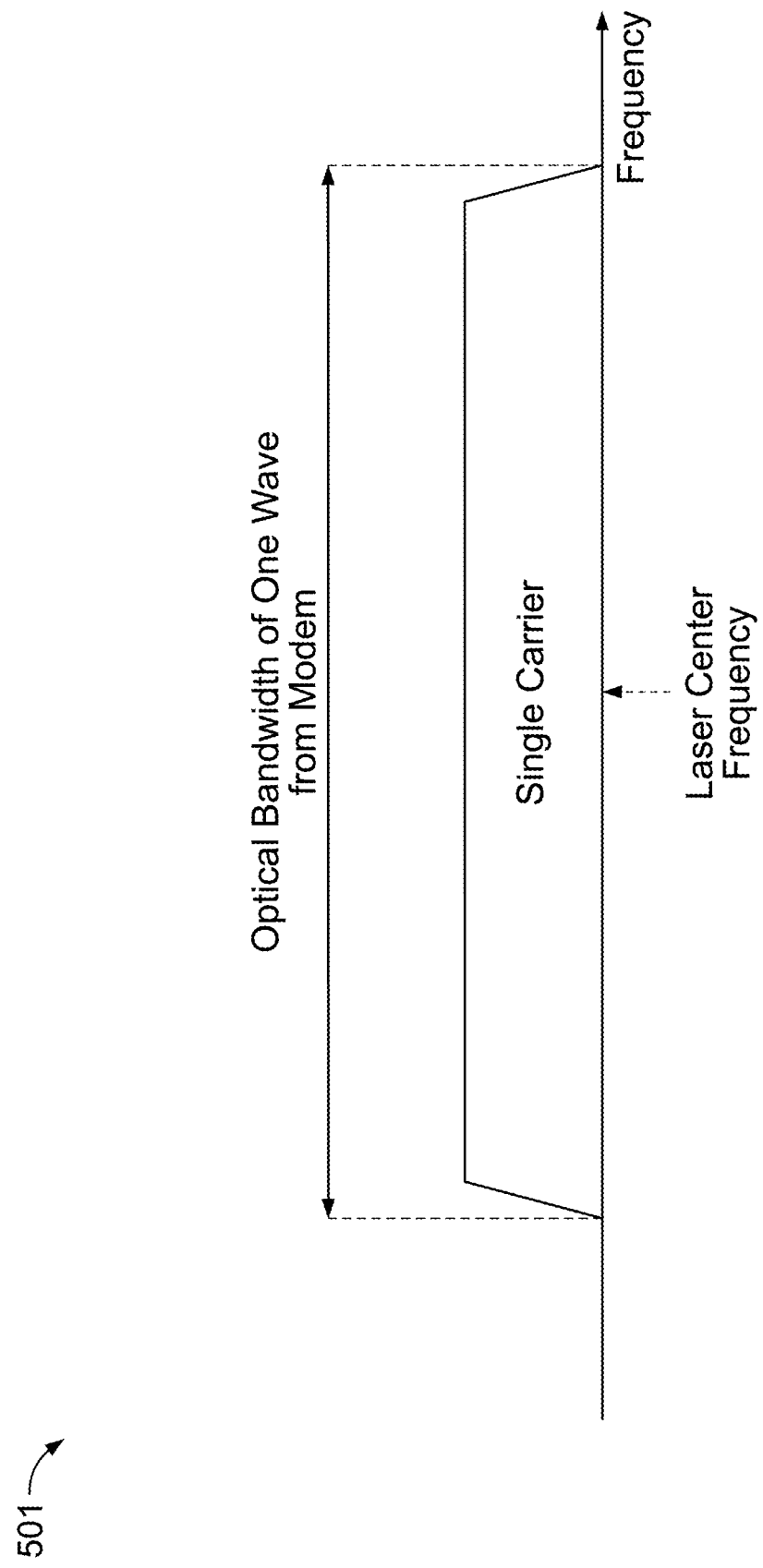

PERTURBATIVE-BASED NONLINEAR COMPENSATION FOR DIGITAL SUBCARRIER SYSTEMS

CROSS REFERENCE TO RELATED APPLICATION

This application claims the benefit of U.S. Provisional Patent Application No. 63/243,893, titled "Perturbative-Based Nonlinear Compensation for Digital Subcarrier Systems" and filed on Sep. 14, 2021, which is incorporated herein by reference in its entirety.

TECHNICAL FIELD

This specification generally relates to optical communication systems and more specifically, relates to performing perturbative-based nonlinear compensation for digital subcarrier systems.

BACKGROUND

Optical networks can be used to communicate data using light signals. Some components in the optical networks can communicate the light signals using subcarriers. Technical challenges arrive when a receiving optical system component attempts to process a particular one of the received subcarriers. In some cases, noise and distortions in the channel can cause interference in the subcarrier signals consequently introducing potential errors in recovering the subcarrier signal data effectively at the receiver.

SUMMARY

The technology described in this disclosure includes a perturbative-based non-linear compensation (NLC) scheme for digital subcarrier multiplexed (SCM) signals with a set of subcarriers ($N_{sc}$) transmitted over an optical network. The techniques address various types of non-linear interactions (e.g., inter and intra subcarrier interferences) between the subcarrier signals in an optical communication system. When subcarrier signals are transmitted over the optical fiber link, the optical fiber link can impart both linear and non-linear effects on the subcarriers. The techniques described in this disclosure can use the NLC scheme to address the non-linear effects, and specifically, correct the non-linear effects caused by intra-subcarrier and inter-subcarrier categories from the optical fiber, up to a first order approximation within the perturbation scheme. Intra-subcarrier categories relate to effects within a subcarrier and inter-subcarrier categories relate to proximate subcarriers.

In some implementations, the techniques to offset non-linear effects imparted by an optical fiber link can be performed in a pre-compensation manner or a post-compensation matter. The system can determine non-linear coefficients on a receiver digital signal processor (DSP). The non-linear coefficients can characterize the optical fiber link and can be used to correct the non-linear effects imparted by the optical fiber link. The determined non-linear coefficients can be applied to a DSP in a pre-compensation manner or a post-compensation manner. In the pre-compensation manner, the determined non-linear coefficients are transmitted on a back-channel from the receiver DSP to the transmitter DSP, where a non-linear compensation processor adjusts the symbols using the non-linear coefficients prior to transmission over the optical fiber. By adjusting the symbols using the non-linear coefficients prior to transmission over the fiber, the non-linear impairments imparted on the transmitted and subsequently received symbols can be reduced to near zero. In the post-compensation manner, the receiver DSP can correct the non-linear effects imparted by the optical fiber by applying the determined non-linear coefficients to the received symbols.

In one general aspect, a receiver includes: a detector circuit operable to receive a first optical signal over an optical link, the first optical signal carrying first data; a carrier recovery estimation circuit operable to generate compensated data by correcting errors in the first data; and a non-linear coefficient estimation circuit operable to (i) receive the compensated data, and (ii) estimate one or more non-linear coefficients, wherein information indicative of the estimated non-linear coefficients is transmitted over an optical network, such that a second optical signal is transmitted based, at least in part, on the estimated non-linear coefficients, the second optical signal being received by the receiver.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the first optical signal includes a plurality of subcarriers and a bandwidth of the plurality of subcarriers corresponds to a bandwidth of the optical link.

In some implementations, the optical link is a first optical link, the estimated non-linear coefficients being transmitted over a second optical link included in the optical network to a transmitter, the transmitter outputting the second optical signal.

In some implementations, to estimate the one or more non-linear coefficients, the non-linear coefficient estimation circuit is operable to: determine, using the compensated data, hard symbol values based on hard decision functions; determine, using the compensated data, hard symbol values based on hard decision functions; estimate, using each triplet symbol value of the plurality of triplet symbol values, the one or more non-linear coefficients using (i) a complex conjugate of the triplet symbol value, (ii) root mean square of the triplet value, (iii) low pass filtering the complex conjugate of the triplet symbol value with an error signal, and (iv) normalizing the low pass filtered value with a square of the root mean square of the triplet value.

In some implementations, the error signal includes amplified spontaneous emission (ASE) noise present in the optical link and a non-linear distortion occurring during transmission of the first optical signal on the optical link.

In some implementations, the receiver includes a digital signal processor, and the digital signal processor includes: a lane-to-lane skew correction circuit operable to correct timing skews associated with digital samples received from one or more analog-to-digital converters (ADCs) in the receiver; a lane-to-lane gain imbalance correction circuit operable to correct amplitude skews associated with the digital samples; an interpolator operable to resample the corrected digital samples to a rate that matches a sampling rate of an RX FDEQ circuit; the RX FDEQ circuit operable to perform one or more post-compensation processes on the re-sampled digital samples to correct for chromatic dispersion; a subcarrier skew circuit operable to correct a chromatic dispersion-induced group delay difference between each subcarrier of the plurality of subcarriers; a TDEQ circuit operable to perform post compensation polarization mode dispersion to recover orthogonal symbols for each subcarrier of the plurality of subcarriers; the carrier recovery estimation circuit; a soft-decision demapper operable to demap one or more bits from the recovered symbols; and a forward error correction decoder operable to apply one or more forward error correction decoding algorithms on the demapped bits.

In some implementations, the second data carried by the second optical signal is processed according to (i) the estimated non-linear coefficients applied by a transmitter to offset non-linear effects imparted by the optical link and (ii) the non-linear effects imparted by the optical link.

In some implementations, the one or more non-line coefficients are based on impairments imparted on the generated compensated data by the optical link.

In some implementations, a transmitter includes: a digital signal processor operable to receive first data for transmission on a first optical link, the digital signal processor including: a non-linear pre-compensation circuit operable to (i) receive one or more non-linear coefficients associated with a second optical link and (ii) adjust the first data based on the one or more non-linear coefficients to pre-compensate for non-linear effects imparted by the first optical link to an optical signal propagating on the first optical link and carrying the first data; and wherein the transmitter is operable to transmit the optical signal on the first optical link.

In some implementations, the digital signal processor of the transmitter includes: a forward error correction encoder operable to apply one or more forward error correction encoding algorithms on a plurality of bits to be transmitted; a bit-to-symbol mapper operable to map the encoded bits to one or more symbols depending on a modulation scheme for transmission; the non-linear pre-compensation circuit; a subcarrier skew circuit operable to skew the adjusted data in time to pre-compensate for a fiber chromatic dispersion applied on the first optical link; a TX FDEQ circuit operable to process the skewed data by performing pre-compensation of chromatic-dispersion induced group delay between spectral components of the skewed data; a lane-to-lane skew correction circuit operable to correct the pre-compensated data for timing skews; a lane-to-lane gain imbalance correction operable to correct the pre-compensated data for amplitude skews; and an interpolator operable to resample the pre-compensated data to a rate that matches a sampling rate of one or more digital-to-analog converters (DACs) on the transmitter.

In some implementations, the one or more DACs are configured to provide the first data to a polarization beam combiner to cause the polarization beam combiner to output the first data to an external receiver over the first optical link.

In some implementations, the non-linear pre-compensation circuit is operable to adjust the first data for transmitting using the one or more non-linear coefficients to pre-compensate for non-linear effects imparted by the second channel further comprises: the non-linear pre-compensation circuit is operable to: receive the one or more symbols from the bit-to-symbol mapper; evaluate, using the one or more symbols, a plurality of triplet streams for each subcarrier of a plurality of subcarriers; multiply each triplet stream of the plurality of triplet streams by the one or more non-linear coefficients; generate a total perturbation value by summing each of the triplet streams multiplied by the one or more non-linear coefficients; and generate the adjusted first data by subtracting the total perturbation value from each of the one or more symbols received from the bit-to-symbol mapper.

In some implementations, the first optical link connects the transmitter and an external receiver.

In some implementations, wherein the second optical link is a back-channel separate from the first optical link and the back-channel connects the non-linear pre-compensation circuit and the external transmitter.

In some implementations, a transceiver includes a receiver and a first transmitter. The receiver includes: a detector circuit operable to receive a first optical signal over an optical link, the first optical signal carrying first data; a carrier recovery estimation circuit operable to generate compensated data by correcting errors in the first data; a non-linear coefficient estimation circuit operable to (i) receive the compensated data, (ii) estimate one or more non-linear coefficients, wherein information indicative of the estimated non-linear coefficients are provided to a first transmitter. The first transmitter is operable to transmit the information indicative of the estimated non-linear coefficients over an optical network, such that a second optical signal is transmitted based, at least in part, on the estimated non-linear coefficients, the second optical signal being received by the receiver.

In some implementations, the first data includes a plurality of subcarriers and a bandwidth of the plurality of subcarriers corresponds to a bandwidth of the first optical link.

In some implementations, the optical link is a first optical link, the estimated non-linear coefficients being transmitted over a second optical link included in the optical network to a transmitter, the transmitter outputting the second optical signal.

In some implementations, to estimate the one or more non-linear coefficients, the non-linear coefficient estimation circuit is operable to: determine, using the compensated data, hard symbol values based on hard decision functions, evaluate, using the hard symbol values and for each subcarrier of a plurality of subcarriers, a plurality of triplet symbol values for each subcarrier of the plurality of subcarriers; and estimate, using each triplet symbol value of the plurality of triplet symbol values, the one or more non-linear coefficients using (i) a complex conjugate of the triplet symbol value, (ii) root mean square of the triplet value, (iii) low pass filtering the complex conjugate of the triplet symbol value with an error signal, and (iv) normalizing the low pass filtered value with a square of the root mean square of the triplet value.

In some implementations, the non-linear estimation circuit enables the transceiver to increase an SNR value for receiving the first optical signal respective non-linear effects of the optical link.

In some implementations, the transceiver includes a digital signal processor, the digital signal processor includes: a lane-to-lane skew correction circuit operable to correct timing skews associated with digital samples received from one or more analog-to-digital converters (ADCs) in the receiver; a lane-to-lane gain imbalance correction circuit operable to correct amplitude skews associated with the digital samples; an interpolator operable to resample the corrected digital samples to a rate that matches a sampling rate of an RX FDEQ circuit; the RX FDEQ circuit operable to perform one or more post-compensation processes on the re-sampled digital samples to correct for chromatic dispersion; a subcarrier skew circuit operable to correct a chromatic dispersion-induced group delay difference between each subcarrier of the plurality of subcarriers; a TDEQ circuit operable to perform post compensation polarization mode dispersion to recover orthogonal symbols for each subcarrier of the plurality of subcarriers; the carrier recovery estimation circuit; a soft-decision demapper operable to demap one or more bits from the recovered symbols; and a forward error correction decoder operable to apply one or more forward error correction decoding algorithms on the demapped bits.

The details of one or more implementations of the subject matter of this specification are set forth in the accompanying drawings and the description below. Other aspects, features and advantages will become apparent from the description, the drawings, and the claims.

BRIEF DESCRIPTION OF THE DRAWINGS

FIG. 5B is a diagram of a single subcarrier depicted over a frequency domain spectrum.

Like reference numbers and designations in the various drawings indicate like elements.

DETAILED DESCRIPTION

Digital compensation of the fiber non-linearity can be applied to digital subcarriers in an optical communication system. The optical communication system can estimate fiber non-linearity in a receiver digital signal processor, and feed the estimated fiber non-linearity back to a transmitter digital signal processor to implement transmitter based perturbative non-linear compensation in pre-compensation. In some implementations, the estimated fiber non-linearity can be used to implement receiver side perturbative non-linear compensation in post-compensation. For example, the receiver digital signal processor can estimate fiber non-linearity using x/y polarization symbols from all subcarriers captured after performing a carrier recovery function inside the receiver digital signal processor. Should pre-compensation be applied, a reverse communication channel can be utilized to send the estimated fiber non-linearity from the receiver digital signal processor to the transmitter digital signal processor.

In the pre-compensation scheme, the transmitter-based perturbative non-linear compensation is applied on any one particular subcarrier using transmitted x/y polarization symbols from that subcarrier and its neighboring subcarriers. In the post-compensation scheme, the receiver-based perturbative nonlinear compensation on any one particular subcarrier using received x/y polarization symbols from that subcarrier and its neighboring subcarriers. The optical communication system can use the pre-compensation scheme and/or the post-compensation scheme.

Figure 1:
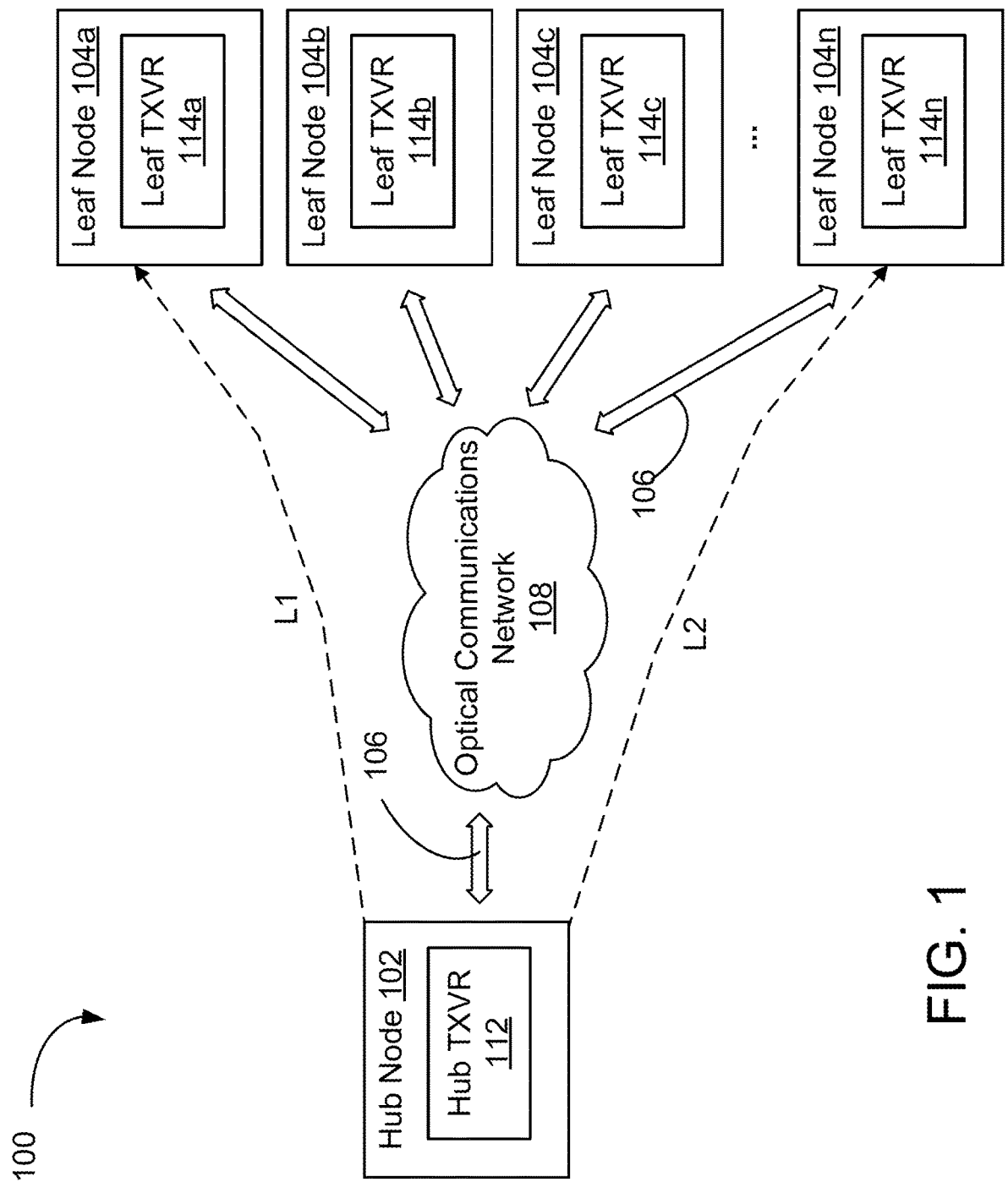
FIG. 1 is an illustration of an example communication system including a hub node, leaf nodes, and an optical communications network.

FIG. 1 depicts an example communication system 100. The communication system 100 can include wired and/or wireless communication systems, and, in some implementations, can be an optical communication network 108. The communication system 100 can be a point-to-point communication system or a point-to-multi-point communication system. For example, communication system 100 includes a hub node 102 and leaf nodes 104a-104n that are communicatively coupled to one another by optical links 106 in an optical communication network 108. In some implementations, the system 100 can be a part of one or more optical transport networks (OTNs) and/or can include one or more OTNs.

Each of the network nodes 102 and 104a-104n can include one or more respective computer devices (e.g., server computer, router, client computer, laptop, desktop). In some implementations, the network nodes can be configured such that each of the network nodes transmits data to and/or receives data from one or more other network nodes. As an example, the hub node 102 can be configured to transmit data to and/or receive data from one or more of the leaf nodes 104a-104n. For instance, hub node 102 can transmit data over an optical link L1 to leaf node 104a and transmit data over another optical link L2 to leaf node 104n. System 100 can include any number of network nodes greater than one (e.g., two, three, four, or more).

Each of the network nodes 102 and 104a-104n can include one or more transmitters and one or more receivers (which, in some implementations, can be combined as one or more transceivers) for transmitting and/or receiving data via the optical links 106 and the optical communications network 108. As an example, the hub node 102 can include a hub transceiver 112 that is coupled to one or more optical links 106. As another example, each of the leaf nodes 104a-104n can include a respective leaf transceiver 114a-114n that is coupled to one or more of the optical links 106. Each of the optical links 106 can be implemented using one or more lengths of optical fiber and/or equipment interconnecting the optical fiber (e.g., line system components). In some implementations, the optical links 106 can collectively define at least a portion of the optical communications network 108.

Figure 15:
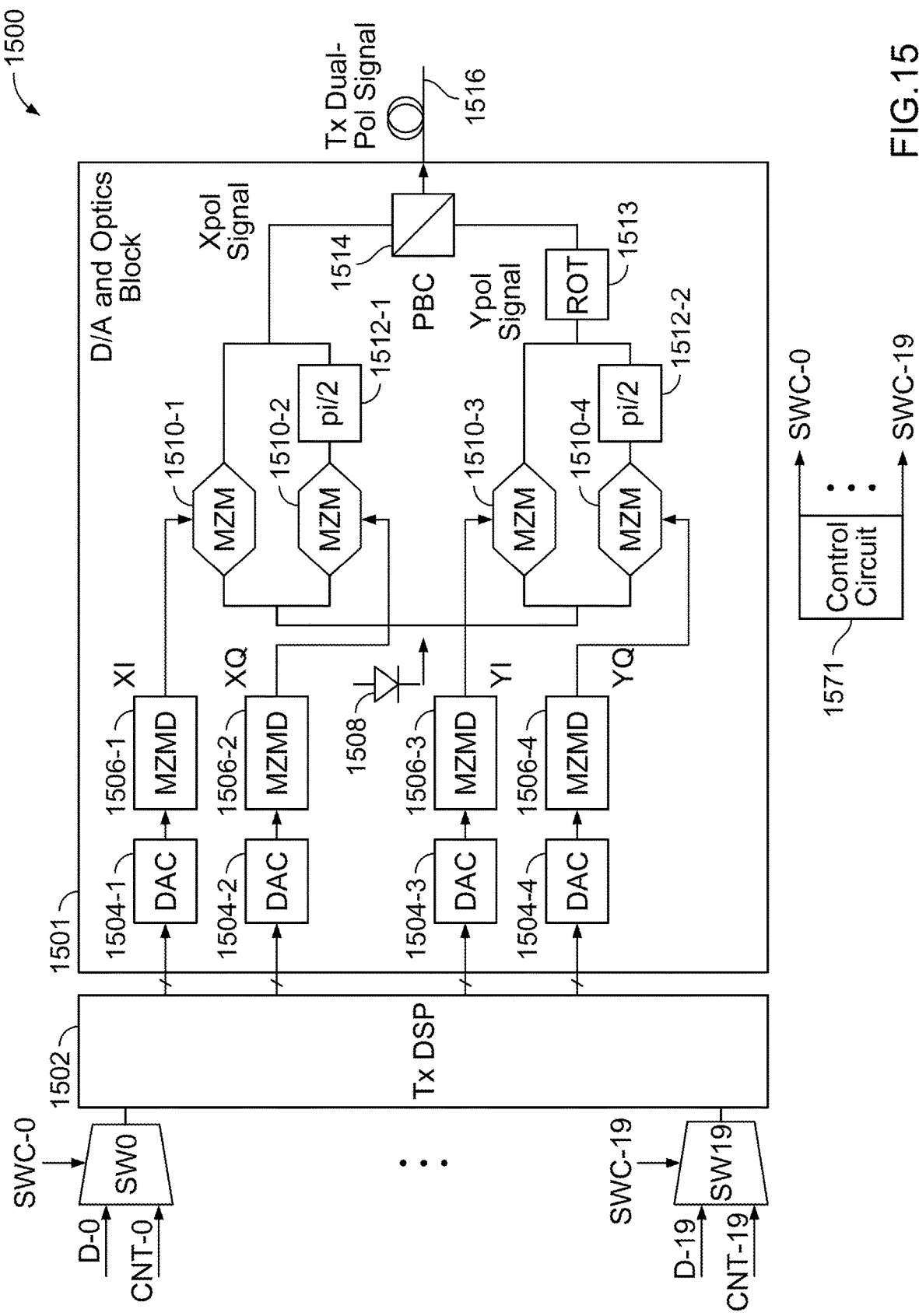
FIG. 15 is a block diagram of an example transmitter.

Example implementations of a transmitter (TX) and receiver (RX) are described with respect to FIGS. 15-18. FIG. 15 depicts an example transmitter 1500 that includes a plurality of switches SW and circuits that include a transmitter Digital Signal Processor DSP (TX DSP) 1502 and a Digital-to-Analog (D/A) and optics block 1501. In some cases, transmitter 1500 can be part of any one of transceivers 112, 114a-114n shown in FIG. 1. In the example shown in FIG. 15, twenty switches (SW-0 to SW-19) are shown, although more or fewer switches can be used. Each switch SW can, in some instances, have two inputs: the first input can receive user data, and the second input can receive control information or signals (CNT). Each switch SW-0 to SW-19 can receive a respective one of control signals SWC-0 to SWC-19 output from control circuit 1571, which can include a microprocessor, field programmable gate array (FPGA), or other processor circuit. Based on the received control signal, each switch SW-0 to SW19 can selectively output any one of the data streams D-0 to D-19, or a control signal CNT-0 to CNT-19. Control signals CNT can be any combination of configuration bits for control and/or monitoring purposes. For example, control signals CNT can include instructions to one or more of leaf nodes 104a, 104b, 104c, 104d to change the data output from such leaf nodes, such as by identifying the subcarriers associated with such data. In another example, the control signals can include a series of known bits used in leaf nodes 104a, 104b, 104c, 104d to "train" a receiver to detect and process such bits so that the receiver can further process subsequent bits. In a further example, the control channel CNT can include information that can be used by the polarization mode dispersion (PMD) equalizer circuits to correct for errors resulting from polarization rotations of the X and Y components of one or more subcarriers (SC). In another example, control information CNT can be used to restore or correct phase differences between laser transmit-side laser 1508 and a local oscillator laser in each of the leaf nodes 104a, 104b, 104c, 104d. In a further example, control information CNT can be used to recover, synchronize, or correct timing differences between clocks provided in the hub node 102 and leaf nodes 104a, 104b, 104c, 104d.

In another example, one or more of switches SW can be omitted, and control signals CNT can be supplied directly to DSP 1502. Moreover, each input to DSP 1502, such as the inputs to FEC encoders 1602 described below (see FIG. 16), receives, in another example, a combination of control information described above as well as user data.

In a further example, control signal CNT includes information related to the number of subcarriers that can be output from each of leaf nodes 104a, 104b, 104c, 104d. Circuits, such as DSP 1502, can similarly be included in a leaf node TX DSP to adjust or control the number of sub carriers output therefrom.

Based on the outputs of switches SW-0 to SW-19, DSP 1502 can supply a plurality of outputs to D/A and optics block 1501 including digital-to-analog conversion (DAC) circuits 1504-1 to 1504-4, which convert digital signal received from DSP 1502 into corresponding analog signals. D/A and optics block 1501 also includes driver MZMD circuits 1506-1 to 1506-4 that receive the analog signals from DACs 1504-1 to 1504-4 and adjust the voltages or other characteristics thereof to provide drive signals to a corresponding one of modulators 1510-1 to Each of the modulators 1510-1 to 1510-4 can be a Mach-Zehnder modulator (MZM) that modulates the phase and/or amplitude of the light output from laser 1508. The optical light signal output from laser 1508, also included in block 1501, is split such that a first portion of the light is supplied to a first MZM pairing, including MZMs 1510-1 and 1510-2, and a second portion of the light is supplied to a second MZM pairing, including MZMs 1510-3 and 1510-4. The first portion of the optical light signal is split further into third and fourth portions, such that the third portion is modulated by MZM 1510-1 to provide an in-phase (I) component of an X (or TE) polarization component of a modulated optical signal, and the fourth portion is modulated by MZM 1510-2 and fed to phase shifter 1512-1 to shift the phase of such light by 90 degrees in order to provide a quadrature (Q) component of the X polarization component of the modulated optical signal. Similarly, the second portion of the optical light signal is further split into fifth and sixth portions, such that the fifth portion is modulated by MZM 1510-3 to provide an I component of a Y (or TM) polarization component of the modulated optical signal, and the sixth portion is modulated by MZM 710-4 and fed to phase shifter 1512-2 to shift the phase of such light by 90 degrees to provide a Q component of the Y polarization component of the modulated optical signal.

The optical outputs of MZM 1510-1 and phase shifter 1512-1 are combined to provide an X polarized optical signal including I and Q components and are fed to a polarization beam combiner (PBC) 1514. In addition, the outputs of MZM 1510-3 and phase shifter 1512-2 are combined to provide an optical signal that is fed to polarization rotator 1513 that rotates the polarization of such optical signal to provide a modulated optical signal having a Y (or TM) polarization. The Y polarized modulated optical signal also is provided to PBC 1514, which combines the X and Y polarized modulated optical signals to provide a polarization multiplexed ("dual-pol") modulated optical signal onto optical fiber 1516, for example, which can be included as a segment of optical fiber in an optical communication path.

Figure 16:
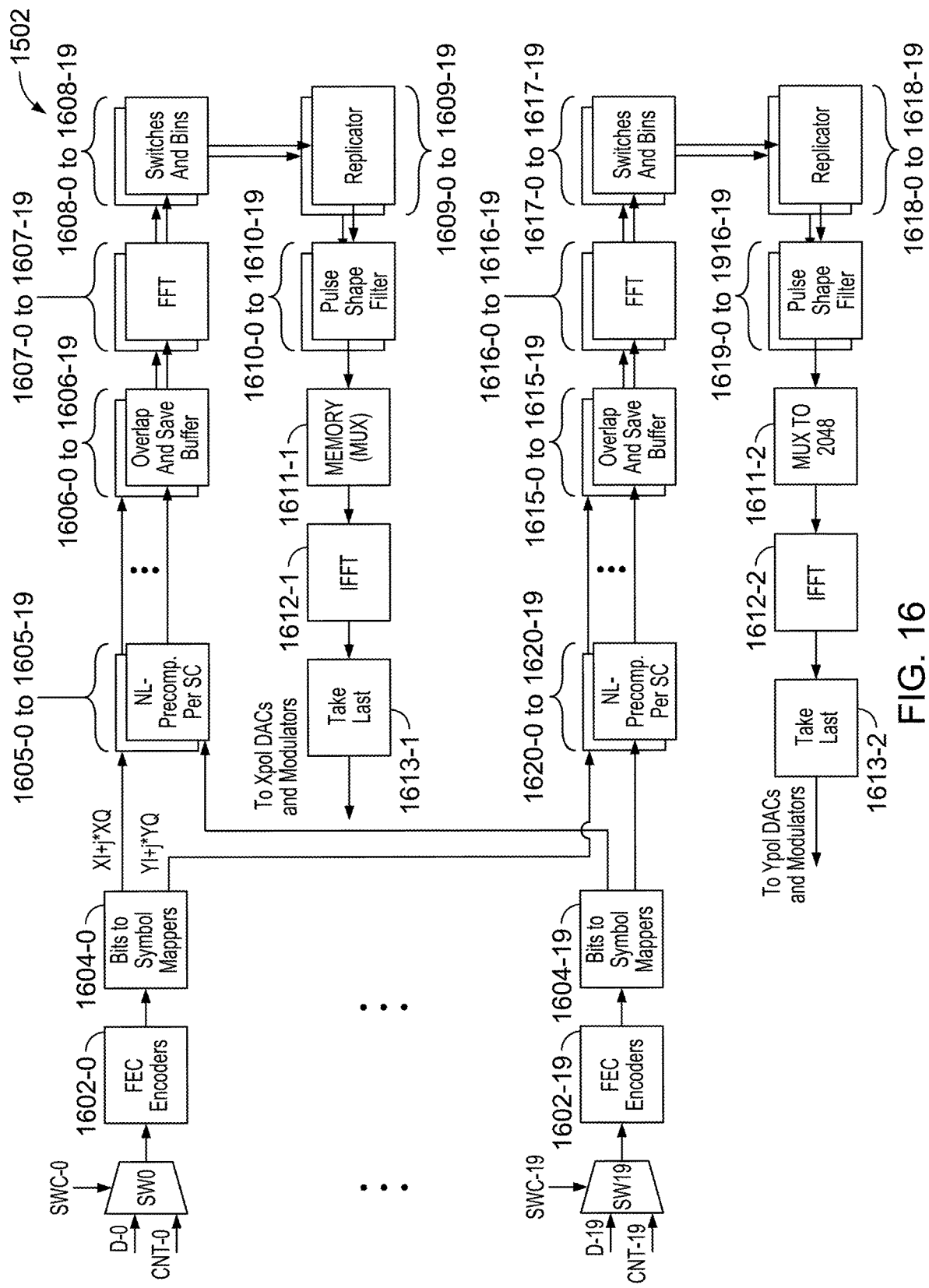
FIG. 16 is a block diagram of an example digital signal processor of the transmitter shown in FIG. 15.

FIG. 16 shows an example of TX DSP 1502 in greater detail. TX DSP 1502 can include FEC encoders 1602-0 to 1602-19, each of which can receive a respective one of a plurality of the outputs from switches SW0 to SW19. The switches SW0 to SW19 can receive data streams D-0 to D-19, control signals CNT-0 to CNT-19, and subcarriers SC0 to SC19, which each have X and Y polarization components and I and Q components. Each subcarrier SC0 to SC19 can be associated with or corresponds to a respective one of the outputs of switches SW-0 to SW-19. In one example, switches SW2, SW7, SW12 can supply control information carried by a respective one of control signals CNT-2, CNT-7, CNT-12. Based on such control signals, DSP 1502 provides outputs that result in optical subcarriers SC2, SC7, SC12 carrying data indicative of the control information carried by CNT-2, CNT-7, CNT-12, respectively. In addition, remaining subcarriers SC0, SC1, SC3 to SC6, SC8 to SC11, SC13 to SC19 carry information indicative of a respective one of data streams D-0, D-1, D-3 to D-6, D-8 to D-11, D-13 to D-19 output from a corresponding one of switches SW0, SW1, SW3 to SW-6, SW-8 to SW11, SW13 to SW19.

FEC encoders 1602-0 to 1602-19 can perform forward error correction coding on a corresponding one of the switch outputs, such as, by adding parity bits to the received data. In addition, FEC encoders 1602-0 to 1602-19 can interleave data.

Each of FEC encoders 1602-0 to 1602-19 provides an output to a corresponding one of a plurality of bits-to-symbol circuits, 1604-0 to 1604-19 (collectively referred to herein as "804"). Each of bits-to-symbol mapping circuits (mappers) 1604 can map the m-encoded bits to symbols (where m is a whole number greater than or equal to 2) on a complex plane.

In some implementations, the bits-to-symbol mappers 1604 can map four bits (m=4) to an X symbol+Y symbol in a dual-polarization QPSK constellation. Each of bits-to-symbol mappers 1604 provide first symbols, having the complex representation XI+j*XQ, associated with a respective one of the switch outputs, such as D-0, to DSP 1502. Data indicative of such first symbols is carried by the X polarization component of each subcarrier SC0-SC19.

Each of bits-to-symbol mappers 1604 further can provide second symbols having the complex representation YI+j*YQ, also associated with a corresponding output of switches SW0-SW19. Data indicative of such second symbols, however, is carried by the Y polarization component of each of subcarriers SC-0 to SC-19.

Such mapping, as performed by mappers 1604-0 to 1604-19 provides, in one example, a particular modulation format for each subcarrier. That is, such circuit can configure a mapping for all the optical subcarrier that is indicative of a binary phase shift keying (BPSK) modulation format, a quadrature phase shift keying (QPSK) modulation format, or an m-quadrature amplitude modulation (QAM, where m is a positive integer, e.g., 4, 8, 16, or 64) format. In another example, one or more of the optical subcarriers can have a modulation format that is different than the modulation format of other optical subcarriers. That is, one of the optical subcarriers can have a QPSK modulation format and another optical subcarrier can have a different modulation format, such as 8-QAM or 16-QAM. In another example, one of the optical subcarriers has an 8-QAM modulation format and another optical subcarriers has a 16 QAM modulation format. Accordingly, although all the optical subcarriers can carry data at the same data and or baud rate, consistent with an aspect of the present disclosure one or more of the optical subcarriers can carry data at a different data or baud rate than one or more of the other optical subcarriers. Moreover, modulation formats, baud rates and data rates can be changed over time depending on, for example, capacity requirements. Adjusting such parameters can be achieved, for example, by applying appropriate signals to mappers 1604 based on control information or data described herein and the communication of such data as further disclosed herein between primary and secondary nodes.

As further shown in FIG. 16, each of the first symbols output from each of bits-to-symbol mappers 1604 is supplied to a respective one of non-linear pre-compensation per subcarrier circuits 1605-0 to 1605-19 (collectively referred to as "non-linear pre-compensation per subcarrier circuits 1605"). Each of non-linear pre-compensation per subcarrier circuits 1605 can receive the first symbols and perform a perturbation-based nonlinearity compensation (PNLC) scheme to pre-compensate nonlinearities applied by the fiber. For example, the nonlinearities can include a Kerr nonlinearity and other non-linear effects. The non-linear pre-compensation per subcarrier circuits 1605 in the TX DSP 1502 can compensate both the intra-subcarrier and inter-subcarrier nonlinear effects. Moreover, the non-linear pre-compensation per subcarrier circuits 1605 can rely on using known symbols or the resultant hard decisions from all subcarriers within the SCM signal as well as a set of non-linear coefficients that depend on the link and other signal parameters, e.g., pulse shape, baud rate per subcarrier, accumulated dispersion, and others.

Each of the non-linear pre-compensation subcarrier circuits 1605 provides pre-compensated symbols outputs to a corresponding one of a plurality of first overlap and save buffers 1606-0 to 16065-19 (collectively referred to as "overlap and save buffers 1606") that can buffer, for example, 256 symbols. Each of overlap and save buffers 1606 can receive, for example, 128 of the first symbols or another number of such symbols at a time from a corresponding one of bits-to-symbol mappers 1604. Thus, overlap and save buffers 1606 can combine, for example, 128 new symbols from non-linear pre-compensation subcarrier circuits 1605, with the previous 128 symbols received from non-linear pre-compensation subcarrier circuits 1605.

Each overlap and save buffer 1606 can supply an output, which is in the time domain, to a corresponding one of fast Fourier Transform (FFT) circuits 1607-0 to 1607-19 (collectively referred to as "FFTs 1607"). In one example, the output includes 256 symbols or another number of symbols. Each of FFTs 1607 can convert the received symbols to the frequency domain using or based on, for example, a fast Fourier transform. Each of FFTs 1607 can provide the frequency domain data to bins and switches blocks 1608-0 to 1608-19 (collectively referred to as "bins and switches blocks 1608"). Bins and switches blocks 1608 can include, for example, memories or registers, also referred to as frequency bins (FB) or points, which store frequency components associated with each subcarrier SC.

Each switch SW can selectively supply either frequency domain data output from one of FFT circuits 1607-0 to 1607-19 or a predetermined value, such as 0. In order to block or eliminate transmission of a particular subcarrier, the switches SW associated with the group of frequency bins FB associated with that subcarrier are configured to supply the zero value to corresponding frequency bins. Replicator components 1609-0 to 1609-19 (collectively referred to as "replicator components 1609") as well as other components and circuits in DSP 1502 can further process the zero (0) values to provide drive signals to modulators 1510, such that subcarrier $SC_0$ is omitted from the optical output from the modulators.

On the other hand, some switches SW' (not shown) can be configured to supply the outputs of FFTs 1607, i.e., frequency domain data FD, to corresponding frequency bins FB. Further processing of the contents of frequency bins FB by replicator components 1609 and other circuits in DSP 1502 can result in drive signals supplied to modulators 1510, whereby, based on such drive signals, optical subcarriers are generated that correspond to the frequency bin groupings associated with that subcarrier.

Each of replicator components or circuits 1609 can replicate the contents of the frequency bins FB and store such contents (e.g., for T/2 based filtering of the subcarrier) in a respective one of the plurality of replicator components. Such replication can increase the sample rate. In addition, replicator components or circuits 1609 can arrange or align the contents of the frequency bins to fall within the bandwidths associated with pulse shaped filter circuits 1610-0 to 1610-19 described below.

Each of pulse shape filter circuits 1610-0 to 1610-19 (collectively referred to as "pulse shape filter circuits 1610") can apply a pulse shaping filter to the data stored in the frequency bins of a respective one of the plurality of replicator components or circuits 1609 to thereby provide a respective one of a plurality of filtered outputs, which are multiplexed and subject to an inverse FFT, as described below. Pulse shape filter circuits 1610 calculate the transitions between the symbols and the desired subcarrier spectrum so that the subcarriers can be packed together spectrally for transmission, e.g., with a close frequency separation. Pulse shape filter circuits 1610 also can be used to introduce timing skew between the subcarriers to correct for timing skew induced by links between nodes in the transmitter 100, for example. Multiplexer component 1611, which can include a multiplexer circuit or memory, can receive the filtered outputs from pulse shape filter circuits 1610, and multiplex or combine such outputs together to form an element vector.

Next, IFFT circuit or component 1612-1 can receive the element vector and provide a corresponding time domain signal or data based on an inverse fast Fourier transform (IFFT). In one example, the time domain signal can have a rate of 64 GSample/s. Take last buffer or memory circuit 1613-1, for example, can select the last 1024 samples, or another number of samples, from an output of IFFT component or circuit 1612-1 and supply the samples to DACs 1504-1 and 1504-2 (see FIG. 15) at 64 GSample/s, for example. As noted above, DAC 1504-1 is associated with the in-phase (I) component of the X pol signal, and DAC 1504-2 is associated with the quadrature (Q) component of the X pol signal. Accordingly, consistent with the complex representation XI+jXQ, DAC 1504-1 receives values associated with XI and DAC 1504-2 receives values associated with jXQ. As indicated by FIG. 15, based on these inputs, DACs 1504-1 and 1504-2 can provide analog outputs to MZMD 1506-1 and MZMD 1506-2, respectively, as discussed above.

As further shown in FIG. 16, each of bits-to-symbol mapping circuits (mappers) 1604-0 to 1604-19 can output a corresponding one of second symbols indicative of data carried by the Y polarization component of the polarization multiplexed modulated optical signal output on fiber 116. As further noted above, these second symbols can have the complex representation YI+j*YQ. Each such second symbol can be processed by a respective one of non-linear pre-compensation per subcarrier circuits 1620-0 to 1620-19, a respective one of overlap and save buffers 1615-0 to 1615-19, a respective one of FFT circuits 1616-0 to 1616-19, a respective one of switches and bins circuits 1617-0 to 1617-19, a respective one of replicator components or circuits 1618-0 to 1618-19, pulse shape filter circuits 1619-0 to 1619-19, multiplexer or memory 1611-2, IFFT 1612-2, and take last buffer or memory circuit 1613-2, to provide processed second symbols having the representation YI+j*YQ in a manner similar to or the same as that discussed above in generating processed symbols XI+j*XQ output from take last circuit 1613-1. In addition, symbol components YI and YQ are provided to DACs 1504-3 and 1504-4 (FIG. 15), respectively. Based on these inputs, DACs 1504-3 and 1504-4 can provide analog outputs to MZMD 1506-3 and MZMD 1506-4, respectively, as discussed above.

While FIG. 16 shows DSP 1502 as including a particular number and arrangement of functional components, in some implementations, DSP 1502 can include additional functional components, fewer functional components, different functional components, or differently arranged functional components. In addition, typically, the number of overlap and save buffers, FFTs, replicator circuits, and pulse shape filters associated with the X component can be equal to the number of switch outputs, and the number of such circuits associated with the Y component can also be equal to the number of switch outputs. However, in other examples, the number of switch outputs can be different from the number of these circuits.

As noted above, based on the outputs of MZMDs 1506-1 to 1506-4, a plurality of optical subcarriers $SC_0$ to $SC_{19}$ can be output onto optical fiber 1516 (FIG. 15).

Figure 17:
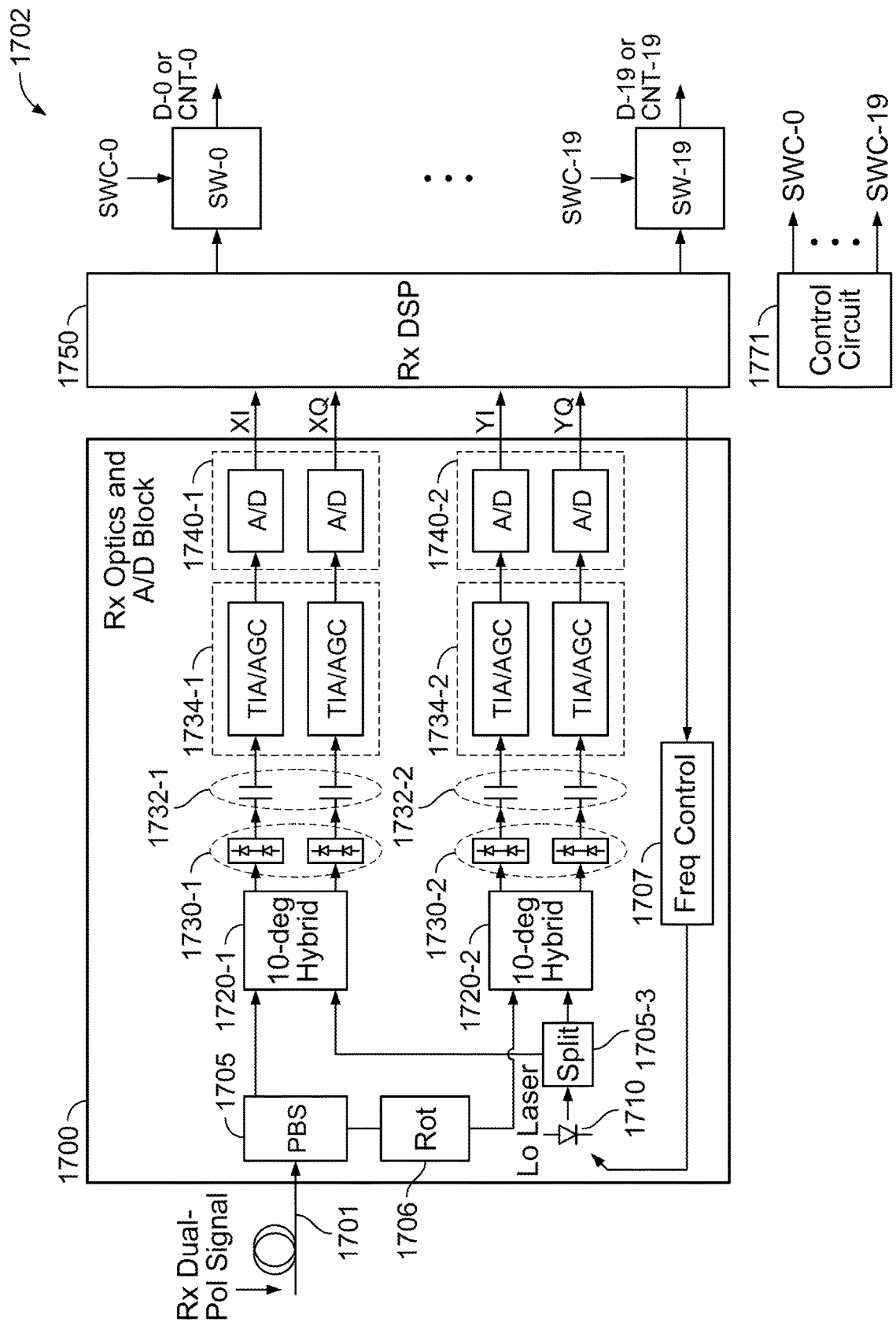
FIG. 17 is a block diagram of an example receiver.

FIG. 17 depicts an example of a receiver Rx such as receiver 1702 that includes an Rx optics and A/D block 1700 and Rx DSP 1750 to receive signals transmitted over optical fiber 1516 and to perform coherent detection. In some cases, receiver 1702 can be part of any one of transceivers 112, 114a-114n shown in FIG. 1.

The Rx optics and A/D block 1700 can include a polarization splitter (PBS) 1705 with first and second outputs, a splitter 1705-3, a local oscillator (LO) laser 1710, 10 degree optical hybrid circuits or mixers 1720-1 and 1720-2 (referred to generally as hybrid mixers 1720 and individually as hybrid mixer 1720), detectors 1730-1 and 1730-2 (referred to generally as detectors 1730 and individually as detector 1730, each including either a single photodiode or balanced photodiode), AC coupling capacitors 1732-1 and 1732-2, transimpedance amplifiers/automatic gain control circuits TIA/AGC 1734-1 and 1734-2, ADCs 1740-1 and 1740-2 (referred to generally as ADCs 1740 and individually as ADC 1740).

Polarization beam splitter (PBS) 1705 can include a polarization splitter that receives an input polarization multiplexed optical signal including optical subcarriers $SC_0$ to $SC_{19}$ supplied by optical fiber link 1701, which can be, for example, an optical fiber segment as part of the optical communication network 108 or optical fiber 1516. PBS 1705 can split the incoming optical signal into the two X and Y orthogonal polarization components. The Y component can be supplied to a polarization rotator 1706 that rotates the polarization of the Y component. Hybrid mixers 1720 can receive and combine the X and rotated Y polarization components with light from local oscillator laser 1710, which, in one example, is a tunable laser. For example, hybrid mixer 1720-1 can combine a first polarization signal (e.g., the component of the incoming optical signal having a first or X (TE) polarization output from a first PBS port with light from local oscillator 1710, and hybrid mixer 1720-2 can combine the rotated polarization signal (e.g., the component of the incoming optical signal having a second or Y (TM) polarization output from a second PBS port) with the light from local oscillator 1710. In one example, polarization rotator 1710 can be provided at the PBS output to rotate the Y component polarization.

Detectors 1730 can detect mixing products output from the optical hybrid mixers 1720, to form corresponding voltage signals, which are subject to AC coupling by capacitors 1732-1 and 1732-1, as well as amplification and gain control by TIA/AGCs 1734-1 and 1734-2. The outputs of TIA/AGCs 1734-1 and 1734-2 and ADCs 1740 can convert the voltage signals to digital samples. For example, two detectors (e.g., photodiodes) 1730-1 can detect the X polarization signals to form the corresponding voltage signals, and a corresponding two ADCs 1740-1 can convert the voltage signals to digital samples for the first polarization signals after amplification, gain control and AC coupling. Similarly, two detectors 1730-2 can detect the rotated Y polarization signals to form the corresponding voltage signals, and a corresponding two ADCs 1740-2 can convert the voltage signals to digital samples for the second polarization signals after amplification, gain control and AC coupling. Rx DSP 1750 can process the digital samples associated with the X and Y polarization components to output data associated with one or more subcarriers within a group of subcarriers.

While FIG. 17 shows receiver 1702 as including a particular number and arrangement of components, in some implementations, receiver 1702 can include additional components, fewer components, different components, or differently arranged components. The number of detectors 1730 and/or ADCs 1740 can be selected to implement a receiver 1702 that is capable of receiving a polarization-multiplexed signal. In some instances, one of the components illustrated in FIG. 17 can carry out a function described herein as being carry out by another one of the components illustrated in FIG. 17.

Consistent with the present disclosure, in order to select a particular subcarrier or group of subcarriers at a secondary node 112, local oscillator 1710 can be tuned to output light having a wavelength or frequency relatively close to the selected subcarrier wavelength(s) to thereby cause a beating between the local oscillator light and the selected subcarrier(s). Such beating will either not occur or will be significantly attenuated for the other non-selected subcarriers so that data carried by the selected subcarrier(s) is detected and processed by Rx DSP 1750.

The local oscillator frequency can be tuned, for example, by changing the temperature of the local oscillator laser 1710 to realize corresponding shifts in the bandwidth to encompass a different group of subcarriers than were detected prior to such bandwidth shift. The temperature of the local oscillator laser 1710 can be controlled with a thin film heater. Alternatively, the local oscillator laser can be frequency tuned by controlling the current supplied to the laser 1710. The local oscillator laser 1710 can be a semiconductor laser, such as a distributed feedback laser or a distributed Bragg reflector laser.

As further shown in FIG. 17, switches or circuits SW-0 to SW-19 can be provided at the output of Rx DSP 1750 to selectively output the data detected from the received subcarriers based on a respective one of control signals CNT-0 to CNT-19 output from control circuit 1771, which, like control circuit 1571 (see FIG. 15) can include a microprocessor, FPGA, or other processor circuit. Control signals can designate the output of each respective switch. Accordingly, for example, if data carried by predetermined subcarriers is intended to be output at a particular leaf node 104*a*, 104*b*, 104*c*, 104*d*, switches SW at that leaf node can be configured, based on the received control signals CNT, to supply the desired data, but block data not intended for that node.

Figure 18:
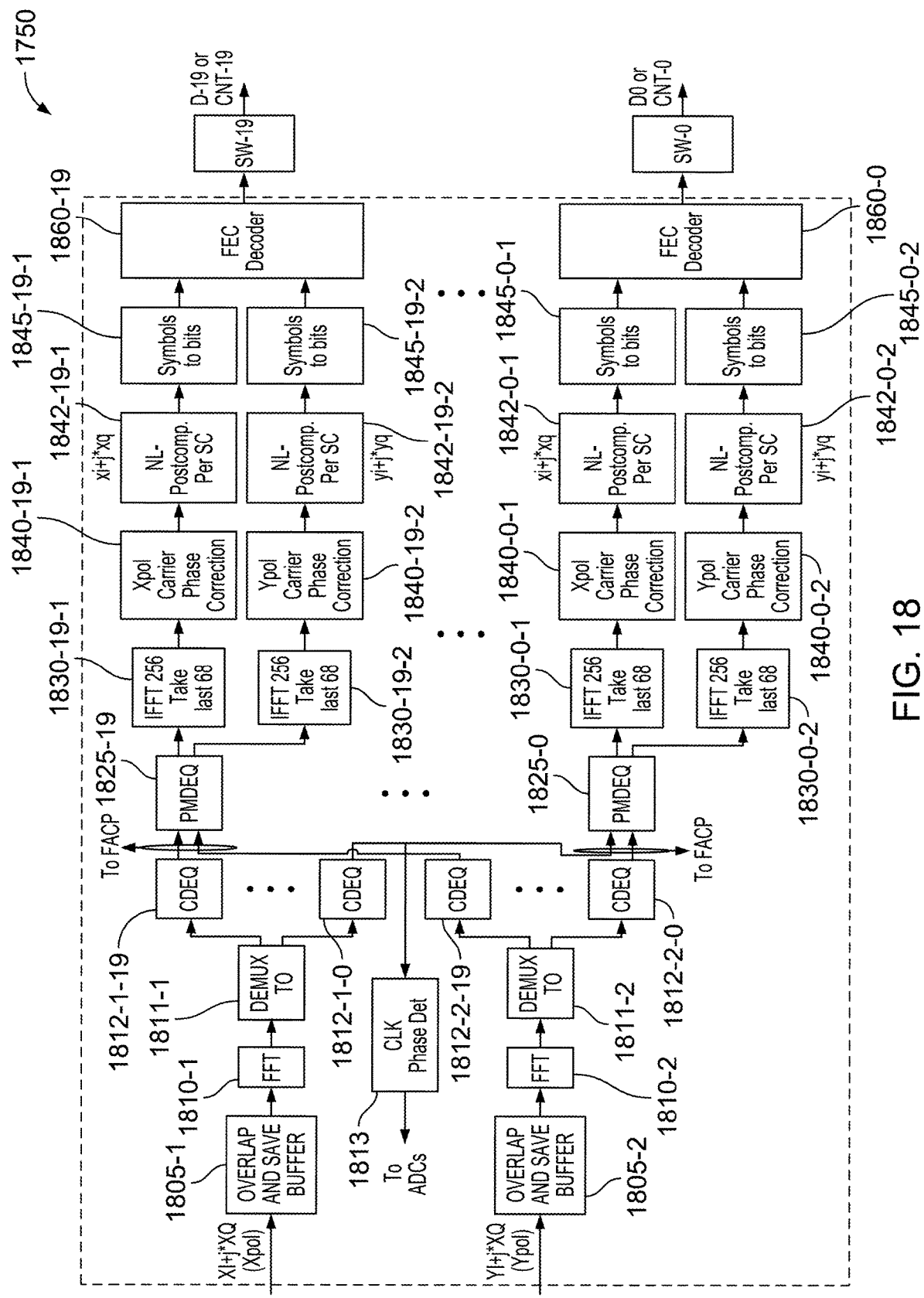
FIG. 18 is a block diagram of an example digital signal processor of the receiver shown in FIG. 17.

FIG. 18 illustrates exemplary components of the Rx DSP 1750. As noted above, analog-to-digital (A/D) circuits 1740-1 and 1740-2 (FIG. 9) output digital samples corresponding to the analog inputs supplied thereto. In one example, each A/D circuit can supply the samples at a rate of 64 GSamples/s. The digital samples may correspond to symbols carried by the X polarization of the optical subcarriers and can be represented by the complex number XI+jXQ. The digital samples can be provided to overlap and save buffer 1805-1, as shown in FIG. 18. FFT component or circuit 1810-1 can receive the 2048 vector elements from the overlap and save buffer 1805-1 and convert the vector elements to the frequency domain using, for example, a fast Fourier transform (FFT). The FFT component 1810-1 can convert the 2048 vector elements to 2048 frequency components, each of which can be stored in a register or "bin" or other memory, as a result of carrying out the FFT.

Demultiplexer 1811-1 can demultiplex the frequency components, and groups of such components can be supplied to a respective one of chromatic dispersion equalizer circuits CDEQ 1812-1-0 to 1812-1-19, each of which can include a finite impulse response (FIR) filter that corrects offsets or reduces the effects of, or errors associated with, chromatic dispersion of the transmitted optical subcarriers. Each of CDEQ circuits 1812-1-0 to 1812-1-19 supplies an output to a corresponding polarization mode dispersion (PMD) equalizer circuit 1825-0 to 1825-19 (which individually or collectively can be referred to as 1825). Without loss of generality, PMD equalization can be done in frequency domain or in time domain after IFFT 1830 and before carrier phase correction 1840.

Digital samples output from A/D circuits 1740-2 associated with Y polarization components of subcarrier SC1 can be processed in a similar manner to that of digital samples output from A/D circuits 1740-1 and associated with the X polarization component of each subcarrier. Namely, overlap and save buffer 1805-2, FFT 1810-2, demultiplexer 1811-2, and CDEQ circuits 1812-2-0 to 1012-2-19 can have a similar structure and operate in a similar fashion as buffer 1805-1, FFT 1810-1, demultiplexer 1811-1, and CDEQ circuits 1812-1-0 to 1812-1-19, respectively. For example, each of CDEQ circuits 1812-2-0 to 1812-2-19 can include an FIR filter that corrects, offsets, or reduces the effects of, or errors associated with, chromatic dispersion of the transmitted optical subcarriers. In addition, each of CDEQ circuits 1812-2-0 to 1812-2-19 can provide an output to a corresponding one of PMDEQ 1825-0 to 1825-19.

As further shown in FIG. 18, the output of one of the CDEQ circuits, such as CDEQ 1812-1-0 can be supplied to clock phase detector circuit 1813 to determine a clock phase or clock timing associated with the received subcarriers. Such phase or timing information or data can be supplied to ADCs 1740-1 and 1740-2 to adjust or control the timing of the digital samples output from ADCs 1740-1 and 1740-2.

Each of PMDEQ circuits 1825 can include another FIR filter that corrects, offsets or reduces the effects of, or errors associated with, PMD of the transmitted optical subcarriers. Each of PMDEQ circuits 1825 can supply a first output to a respective one of IFFT components or circuits 1830-0-1 to 1830-19-1 and a second output to a respective one of IFFT components or circuits 1830-0-2 to 1830-19-2, each of which can convert a 256-element vector, in this example, back to the time domain as 256 samples in accordance with, for example, an inverse fast Fourier transform (IFFT).

Time domain signals or data output from IFFT 1830-0-1 to 1830-19-1 are supplied to a corresponding one of Xpol carrier phase correction circuits 1840-0-1 to 1840-19-1, which can apply carrier recovery techniques to compensate for X polarization transmitter (e.g., laser 1508) and receiver (e.g., local oscillator laser 1710) linewidths. In some implementations, each carrier phase correction circuit 1840-0-1 to 1840-19-1 can compensate or correct for frequency and/or phase differences between the X polarization of the transmit signal and the X polarization of light from the local oscillator 1710 based on an output of Xpol carrier recovery circuits 1840-0-1 to 1840-19-1, which performs carrier recovery in connection with one of the subcarrier based on the outputs of IFFTs 1830-0-1 to 1830-19-1. After such X polarization carrier phase correction, the data associated with the X polarization component can be represented as symbols having the complex representation xi+j*xq in a constellation, such as a QPSK constellation or a constellation associated with another modulation formation, such as an m-quadrature amplitude modulation (QAM), m being an integer. In some implementations, the taps of the FIR filter included in one or more of PMDEQ circuits 1825 can be updated based on the output of at least one of carrier phase correction circuits 1840-0-1 to 1840-19-01.

In a similar manner, time domain signals or data output from IFFT 1830-0-2 to 1830-19-2 are supplied to a corresponding one of Ypol carrier phase correction circuits 1840-0-2 to 1840-19-2, which can compensate or correct for Y polarization transmitter (e.g., laser 1508) and receiver (e.g., local oscillator laser 1710) linewidths. In some implementations, each carrier phase correction circuit 1840-0-2 to 1840-19-2 also can correct or compensate for frequency and/or phase differences between the Y polarization of the transmit signal and the Y polarization of light from the local oscillator 1710. After such Y polarization carrier phase correction, the data associated with the Y polarization component can be represented as symbols having the complex representation yi+j*yq in a constellation, such as a QPSK constellation or a constellation associated with another modulation formation, such as an m-quadrature amplitude modulation (QAM), m being an integer. In some implementations, the output of one of circuits 1840-0-2 to 1840-19-2 can be used to update the taps of the FIR filter included in one or more of PMDEQ circuits 1825 instead of, or in addition to, the output of at least one of the carrier recovery circuits 1840-0-1 to 1840-19-1.

The equalizer, carrier recovery, and clock recovery can be further enhanced by utilizing the known (training) bits that can be included in control signals CNT, for example by providing an absolute phase reference between the transmitted and local oscillator lasers.

Each of the non-linear post-compensation per subcarrier circuits 1842-0-1 to 1842-19-1 can receive the symbols output from a corresponding one of circuits 1840-0-1 to 1840-19-1 and perform one or more post-compensation processes on the symbols. Specifically, the non-linear post-compensation per subcarrier circuits 1842-0-1 to 1842-19-1 can estimate the fiber, e.g., fiber 1506, nonlinearity and provide data indicative of the estimation back to the TX DSP 1502 for the TX DSP 1502 to implement transmit-based perturbative non-linear compensation. For example, the non-linear post-compensation per subcarrier circuits 1842-0-1 to 1842-19-1 can estimate non-linear coefficients and apply those coefficients at the RX DSP 1750 to correct the fiber non-linearities or transmit those coefficients to the TX DSP 1502 over a backchannel and apply those coefficients in the pre-processing stage at the non-linear pre-compensation per subcarrier 1605.

Each of the symbols-to-bits circuits or components 1845-0-1 to 1845-19-1 can receive the non-linear compensated symbols output from a corresponding one of circuits 1842-0-1 to 1842-19-1 and map the compensated symbols back to bits. For example, each of the symbol-to-bits components 1845-0-1 to 1845-19-1 can demap one X polarization symbol, in a QPSK or m-QAM constellation, to Z bits, where Z is an integer. For dual-polarization QPSK modulated sub-carriers, Z is two. Bits output from each of component 1845-0-1 to 1845-19-1 are provided to a corresponding one of FEC decoder circuits 1860-0 to 1860-19.

Y polarization symbols are output form a respective one of circuits 1842-0-2 to 1842-19-2, each of which has the complex representation yi+j*yq associated with data carried by the Y polarization component. Each Y polarization, like the X polarization symbols noted above, can be provided to a corresponding one of symbols-to-bits circuits or components (demappers) 1845-0-2 to 1845-19-2, each of which has a similar structure and operates in a similar manner as symbols-to-bits component 1845-0-1 to 1845-19-1. Each of circuits 1845-0-2 to 1845-19-2 can provide an output to a corresponding one of FEC decoder circuits 1860-0 to 1860-19.

Each of FEC decoder circuits 1860 can remove errors in the outputs of symbol-to-bit circuits 1845 using, for example, forward error correction. Such error corrected bits, which can include user data for output, can be supplied to a corresponding one of switch circuits SW-0 to SW-19. As noted above, switch circuits SW-0 to SW-19 in each leaf node 104*a*, 104*b*, 104*c*, 104*d* can selectively supply or block data based on whether such data is intended to be output at the leaf node. In addition, if one of the received subcarriers' control information (CNT), such as information identifying switches SW that output data and other switches SW that block data, the control information can be output from one of the switches and, based on such control information, control circuit 1771 in the leaf nodes to generate the control signals CNT.

Consistent with another aspect of the present disclosure, data can be blocked from output from Rx DSP 1750 without the use of switches SW-0 to SW-19. In one example similar to an example described above, zero (0) or other predetermined values can be stored in frequency bins associated with the blocked data, as well as the subcarrier corresponding to the blocked data. Further processing described above of such zeroes or predetermined data by circuitry in Rx DSP 1750 can result in null or zero data outputs, for example, from a corresponding one of FEC decoders 1060. Switch circuits provided at the outputs of FFTs 1810-1 and 1810-2, like switch circuits SW described above in FIG. 16, can be provided to selectively insert zeroes or predetermined values for selectively blocking corresponding output data from DSP 1750. Such switches also can be provided at the output of or within demultiplexers 1811-1 and 1811-2 to selectively supply zero or predetermined values.

In another example, zeroes (0s) can be inserted in chromatic dispersion equalizer (CDEQ) circuits 1812 associated with both the X and Y polarization components of each subcarrier. In particular, multiplier circuits (provided in corresponding butterfly filter circuits), like multiplier circuits M described above, can selectively multiply the inputs to the CDEQ circuit 1012 by either zero or a desired coefficient. Multiplication by a zero generates a zero product. When such zero products are further processed by corresponding circuitry in DSP 1750, e.g., corresponding IFFTs 1830, carrier phase correction components 1840, non-linear post-compensation per subcarrier 1842, symbol-to-bits components 1845, and FEC decoder 1860, a corresponding output of DSP 1750 will also be zero. Accordingly, data associated with a sub carrier SC received by a leaf node receiver, but not intended for output from that receiver, can be blocked.

If, on the other hand, capacity requirements change and such previously blocked data is to be output from a given leaf node receiver DSP (e.g., DSP 1750), appropriately coefficients can be supplied to the multiplier circuits, such that at least some of the inputs thereto are not multiplied by zero. Upon further processing, as noted above, data associated with the inputs to the multiplier circuits and corresponding to a particular subcarrier SC is output from leaf node receiver DSP (e.g., DSP 1750).

While FIG. 18 shows DSP 1750 as including a particular number and arrangement of functional components, in some implementations, DSP 1750 can include additional functional components, fewer functional components, different functional components, or differently arranged functional components.

Referring back to FIG. 1, in some implementations, a network node can transmit data by generating optical signals that are modulated according to one or more optical subcarriers that are associated with the intended destination or destinations of the data. For example, the hub node 102 can receive data packets (e.g., from the hub node 102 itself and/or from another network node or user device), ascertain the intended destination of each of the data packets, and identify one or more respective optical subcarriers that can be used to transmit data to each of those destinations. Based on this information, the hub node 102 can generate one or more optical signals (e.g., using one or more light emitters, such as laser emitters), modulate the optical signals according to the identified optical subcarriers (e.g., using one or more local oscillators, multiplexers, etc.), and transmit the modulated optical signals over one or more optical links to each of the intended destinations (e.g., one or more of the leaf nodes 104-104n).

The hub node 102 includes several components including a hub transceiver 112 that can generate one or more optical signals, and transmit the optical signals (e.g., via one or more egress network interfaces) to the optical communications network 108. For example, hub transceiver 112 can generate an optical signal that is modulated according to multiple sets of optical subcarriers (e.g., SC Groups 1-4), where each set of optical subcarriers is associated with a different one of the leaf nodes 104a-104n. In some implementations, the hub transceiver 112 can provide the optical signal to the splitter/combiner, which splits the optical signal into several power-divided instances of the optical signal. Each of the power-divided instances of the optical signal can be transmitted to a respective one of the leaf nodes 104a-104n (e.g., via an optical link 106).

In some implementations, at least some of the ingress network interfaces can include an Ethernet interface, an OTN interface, and/or a Serializer/Deserializer (SerDes) interface. Further, at least some of the egress network interfaces can include a SerDes interface.

Each of the leaf nodes 104a-104n can receive a respective instance of the optical signal, and selectively demodulate that instance of the optical signal according to the set of optical subcarriers to which it is assigned (e.g., to recover the data that is intended for it). Further, each of the leaf nodes 104a-104n can selectively filter, block, or otherwise not demodulate the respective optical signal according to the sets of optical subcarriers to which it is not assigned (e.g., such that it refrains from recovering the data that is not intended for it).

Figure 2:
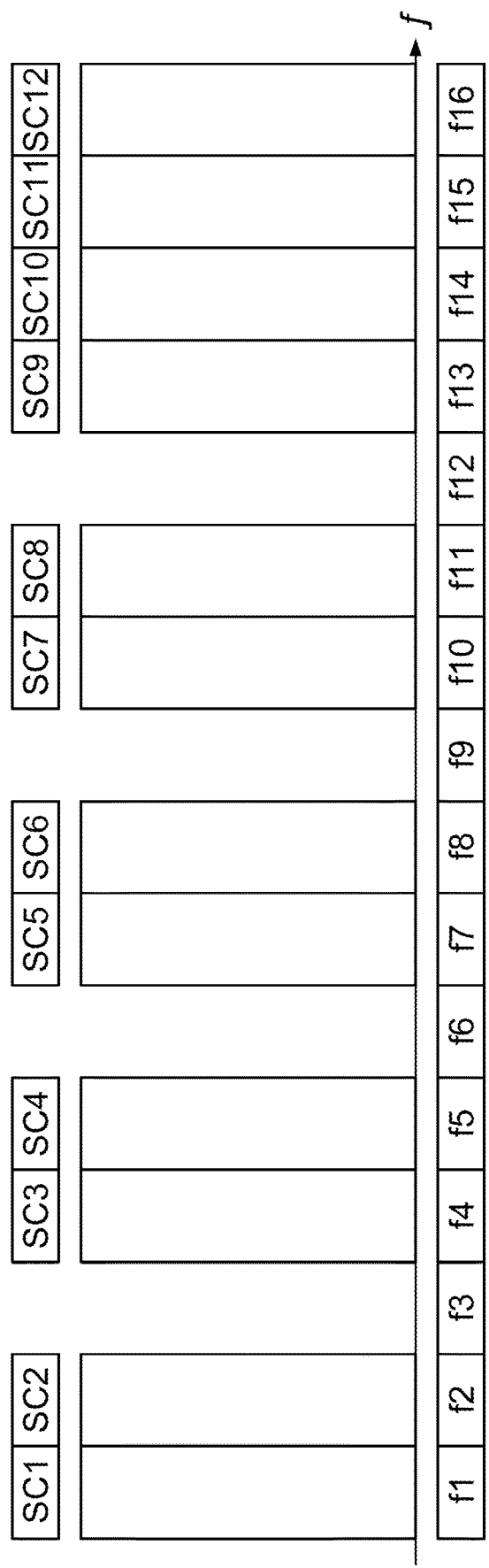
FIG. 2 is a diagram of optical subcarriers depicted over a frequency domain spectrum.

FIG. 2 is a diagram of optical subcarriers depicted over a frequency domain spectrum. Specifically, FIG. 2 shows example sets of optical subcarriers SC1-SC16 that may be made available for use by the hub node 102 and the leaf nodes 104a-104n. In this example, the optical subcarriers SC1-SC16 (corresponding to frequencies f1-f16) are available for exchanging data between the hub node 102 and the leaf nodes 104a-104n. Further, each of the optical subcarriers SC1-SC16 are spectrally contiguous with respect to the frequency domain (e.g., the frequencies f1-f16 define a continuous range of frequencies).

In an example configuration, the hub node 102 and the leaf node 104a can be assigned the optical subcarrier SC1 for exchanging data between them. Further, the hub node 102 and the leaf node 104b can be assigned the optical subcarrier SC2 for exchanging data between them. Further still, the hub node 102 and the leaf node 104c can be assigned the optical subcarrier SC3 for exchanging data between them. The other optical subcarriers can be assigned in a similar manner to facilitate the exchange of data between other pairings of the hub node 102 and the leaf nodes.

In some implementations, a single optical subcarrier can be allocated to transmit data between two respective network nodes. In some implementations, multiple optical subcarriers (e.g., two, three, four, or more) can be allocated to transmit data between two respective network nodes.

In some implementations, at least some of the subcarriers described herein can be Nyquist subcarriers. A Nyquist subcarrier is a group of optical signals, each carrying data, where (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

Although FIG. 2 shows an example configuration of twelve optical subcarriers, FIG. 2 is merely an illustrative example. In general, various number of optical subcarriers can be used by the network nodes 102 and 104a-104n to exchange data. Further, some, none, or all of optical subcarriers can be spectrally contiguous with one another with respect to the frequency domain. Further, some, none, or all of optical subcarriers can be spectrally separated from one another with respect to the frequency domain (e.g., such that one or more guard bands are positioned spectrally between adjacent optical subcarriers in the frequency domain).

In some implementations, the hub node 102 and/or the leaf nodes 104a-104n can include or be connected to pluggable devices that are configured to enhance the functionality of the network nodes 102 and 104a-104n. For example, at least some of the hub transceiver 112 and/or the leaf transceiver 114a-114n can include a physical communications interface (e.g., a plug or socket) that is configured to reversibly insert into and/or receive corresponding physical communications interface of a network node 102 or 104a-104n, and exchange information with that network node to facilitate network operations and performance.

Figure 3:
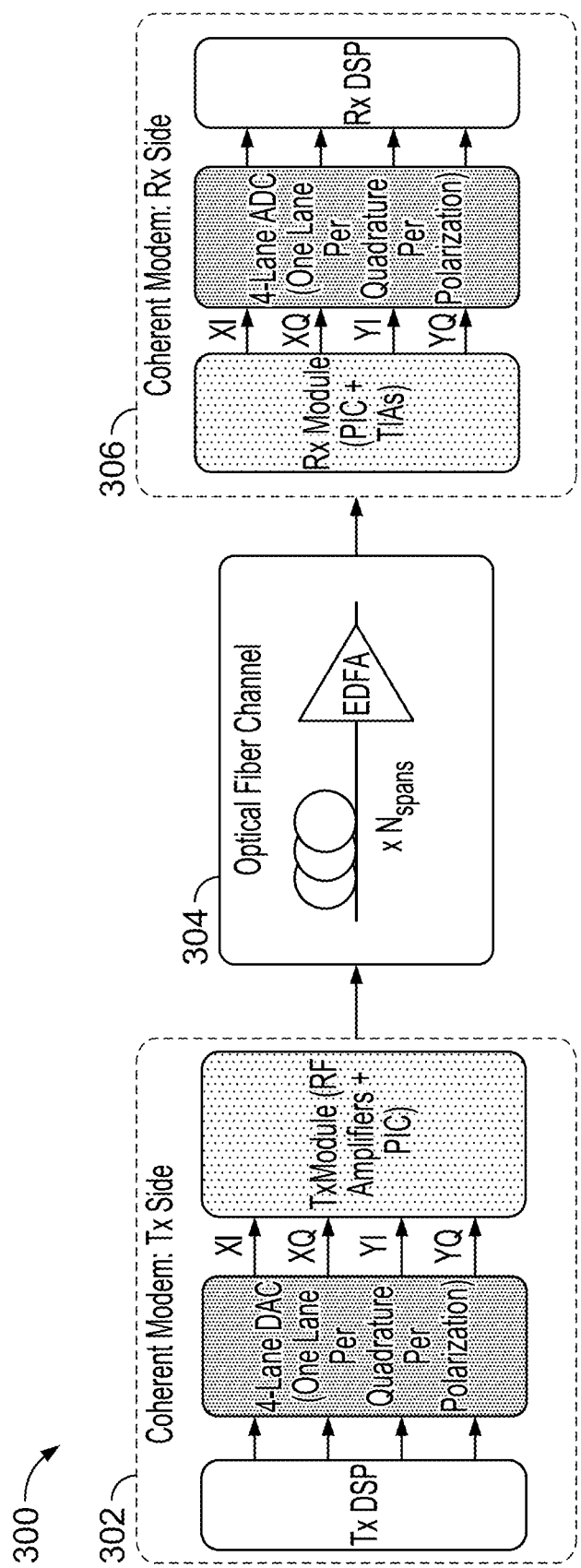
FIG. 3 is an illustration of an example coherent optical communication system.

FIG. 3 is an illustration of an example coherent optical communication system 300. As illustrated in the coherent optical communication system 300, an end-to-end coherent transmission system is provided including a coherent modem with a transmitter 302 and a receiver 306. In some implementations, the transmitter 302 may be part of a transceiver and may be optically connected to the receiver 306 via link 304. Additionally, link 304 may include one or more optical amplifiers that amplify an optical signal as the optical signal is transmitter over link 304.

In some implementations, the transmitter 302 may include a number of optical transmitters, wave-guides, and/or optical multiplexer. In some implementations, transmitter 302 may include additional components, fewer components, different components, or differently arranged components. For example, as illustrated in system 300, the transmitter 302 can include a digital signal processing (DSP) application specific integrated circuit (ASIC), four-channel digital-to-analog converter (DAC), and a transmit (TX) module containing four radio frequency (RF) amplifiers, e.g., drivers, and a photonic integrated circuit (PIC).

The optical transmitters in the transmitter 302 can receive data for a data channel, create multiple subcarriers for the data channel, map data, for the data channel, to the multiple subcarriers, module the data with an optical signal to create a multiple subcarrier output optical signal, and transmit the multiple subcarrier output optical signal. For example, the transmitter 302 may include 5, 10, 20, 50, 100, or some other quantity of optical transmitters. Each optical transmitter may be tuned to use an optical carrier of a designated wavelength. In some implementations, each of the optical transmitters may include a TX DSP, a DAC, a laser, a modulator, and/or some other components. The laser and/or the modulator may be coupled with a tuning element that can be used to tune the wavelength of the optical signal channel.

For example, in the transmitter 302, the TX-DSP ASIC can generate four independent digital signals which are then converted by the DACs into four analog waveforms. The analog waveforms out of the DACs are then fed into the TX module where four RF amplifiers amplify the analog waveforms to a sufficiently large voltage signals. Then, the TX Module modulates the in-phase and quadrature components of the amplified signals on two orthogonal polarizations of a continuous-wave (CW) (or unmodulated) light generated from a TX laser source on the PIC. The combination of TX DSP and DACs enables the coherent modem to synthesize arbitrarily the four components XI, XQ, YU, and YQ of a dual-polarization (DP) optical field at the output of the transmitter 302. In this manner, the TX DSP can perform operations such as, for example, chromatic dispersion (CD) pre-compensation, Nyquist pulse shaping, digital subcarrier multiplexing (SCM), and other processes to aid the receiver 306's reception of the signals.

In some implementations, the transmitter 302 propagates the modulated optical signal through the link 304. The link 304 may include an optical fiber. Link 304 may transport one or more optical signals associated with multiple wavelengths. The link 304 may include multiple spans of silica fiber ($N_{spans}$) typically with erbium doped fiber amplifiers (EDFAs). Each EDFA restores the launch power of the modulated optical signal to its original value at the beginning of each space by setting its gain equal to the preceding span loss incurred due to fiber loss, e.g., fiber attenuation and others.

In addition, each EDFA can add noise to the modulated optical signal while amplifying the modulated optical signal. This noise can be referred to as amplified spontaneous emission (ASE) noise. For example, ASE noise can degrade the signal fidelity as light or the modulated optical signal can pass through many EDFAs in various environments, e.g., in a subsea or long-haul transmission link. Moreover, each EDGA can add some ASE noise which finally degrades the signal-to-noise (SNR) ratio of the modulated optical signal and can limit the transmission distance or reach of the optical communication system 300.

Additionally, besides attenuation and noise, an optical modulated signal propagating through optical fiber can suffer from chromatic dispersion (CD) due to frequency (or wavelength) dependence of the refractive index of the silica fiber of the link 304. Thus, at the receiver 305, when the modulated optical signal is receiver, CD results in linear inter-symbol interference (ISI) between the symbols of the modulated optical signal transmitted serially in time. In addition, a dual-polarization modulated signal suffers from polarization mode dispersion (PMD) that takes place physically due to different group velocities between two orthogonal polarization states. The axes over which the group delay difference is incurred rotate along the fiber in a random fashion resulting in linear ISI due to PMD. Both CD and PMD are mitigated in a typical DSP ASIC of the coherent modem as will be shown and described later.

In some implementations, the propagating signal transmitted from the transmitter 302 over the link 304 also incurs non-linear distortion. For example, the propagating signal can suffer from Kerr non-linear distortion due to intensity-induced refractive index changes of the glass medium. In some implementations, one or both of the transmitter 302 and the receiver 306 can apply a DSP-based non-linear compensation (NLC) scheme that can mitigate the non-linear effects. For example, the NLC schemes implemented by the transmitter 302 and the receiver 306 can aid in mitigating Kerr non-linearity from an optical fiber channel.

In some implementations, the receiver 306 may include an optical demultiplexer, waveguides, and/or optical receiver. In some implementations, receiver module may include additional components, fewer components, different components, or differently arranged components.

Optical demultiplexer may include an AWG or some other demultiplexer device. Optical demultiplexer may supply multiple optical signals based on receiving one or more optical signals, such as WDM signals, or components associated with the one or more optical signals. The waveguides may include an optical link or some other link to transmit optical signals, output from optical demultiplexer, to optical receivers. In some implementations, each optical receiver may receive optical signal via a single waveguide or via multiple wave-guides.

Optical receivers may each include one or more photodetectors and related devices to receive respective input optical signals outputted by optical demultiplexer, detect the subcarriers associated with the input optical signals, convert data within the subcarriers to voltage signals, convert the voltage signals to digital samples, and process the digital samples to produce output data corresponding to the input optical signals. Optical receiver may each operate to convert the input optical signal to an electrical signal that represents the transmitted data. In some implementations, each of the optical receivers in the receiver 306 may include a local oscillator, a hybrid mixer, a detector, an ADC, an RX DSP, and/or some other components.

For example, as illustrated in system 300, the receiver 306 can include the RX PIC and four transimpedance amplifiers (TIAs). The RX PIC includes photodiodes, in which the received optical modulated signal travels with a CW light from a local oscillator (LO) laser. The four photocurrents from the photodiodes are linearly proportional to the received in-phase and quadrature components on two orthogonal polarization states, namely XI, XQ, YI, and YQ. The TIAs can then amplify the four photocurrents while converting them into voltage signals. Then, four analog-to-digital converters (ADCs) can sample the voltage signals and convert them to digital signals. The four digitized signals are then fed to the RX DSP ASIC on the receiver 306. The RX DSP ASIC can execute one or more DSP algorithms to mitigate various impairments imparted on the optical modulated signal during the transmission process, e.g., CD, PMD, laser phase noise, frequency offset, etc., and to detect the module information on the four components of the DP optical field.

Figure 4:
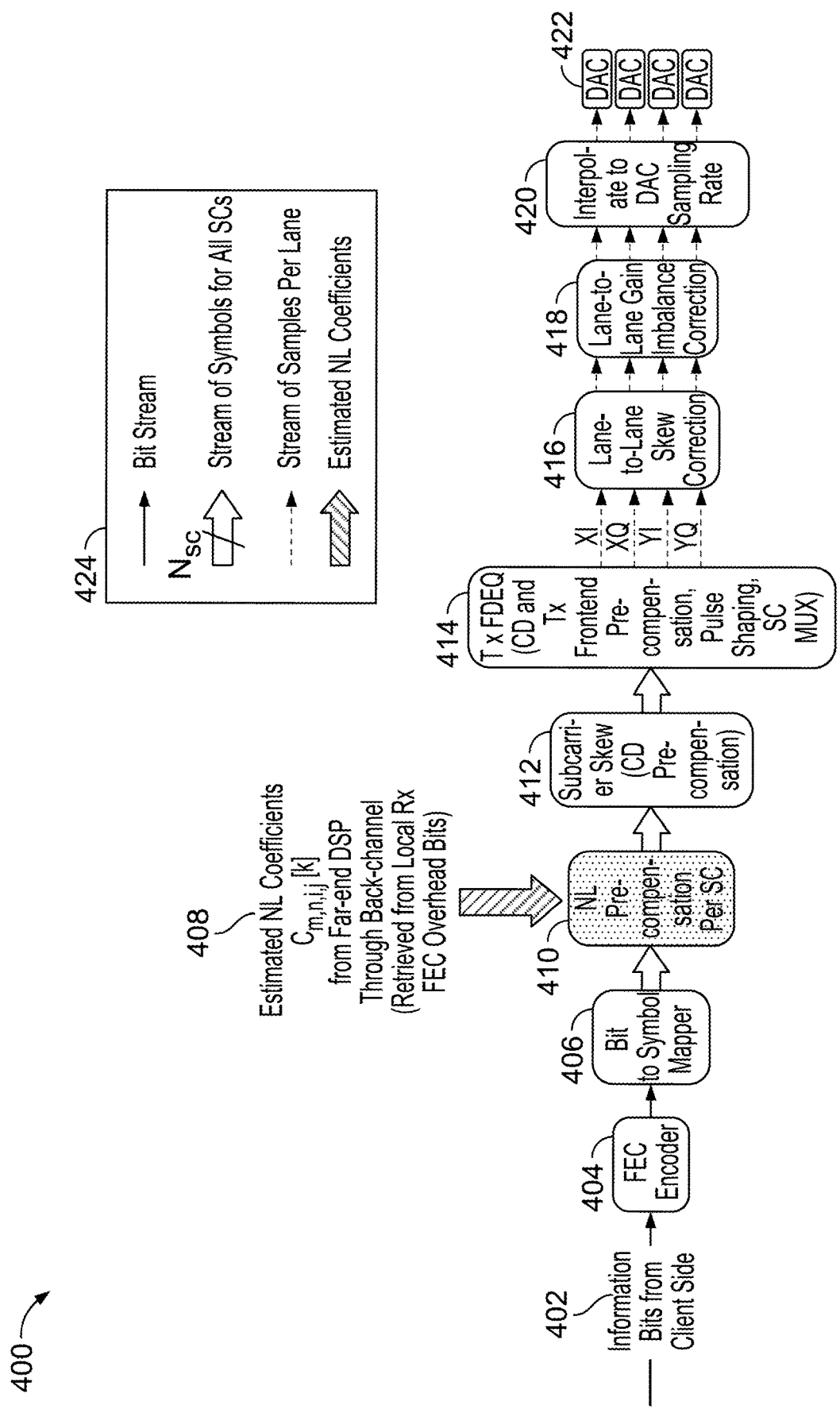
FIG. 4 is a block diagram of an example digital signal processor at a transmitter.

FIG. 4 is a block diagram of an example digital signal processor 400 at a transmitter. For example, the digital signal processor (DSP) 400 may be included within the coherent transmitter 302 of the system 300. In some implementations, the transmitter may include a DSP 400, a DAC, a laser, and a modulator. In some implementations, the DSP 400 and the DAC may be implemented using an ASIC and/or may be implemented on a single integrated circuit, such as a single PIC. In some implementations, the laser and the modulator may be implemented on a single integrated circuit, such as a single PIC. In some implementations, the DSP 400, DAC, laser, and/or modulator may be implemented on one or more integrated circuits, such as one or more PICs. For example, in some example implementations, components of multiple optical transmitters may be implemented on a single integrated circuit, such as a single PIC, to form a super-channel transmitter. FIG. 4 illustrates a legend 424 that illustrates the data flow of between components of the digital signal processor 400.

The DSP 400 may include one or more digital signal processors. The DSP 400 may receive input data from a data source, and determine the signal to apply to a modulator to generate multiple subcarriers. The DSP 400 may receive streams of data, map the streams of data into each of the subcarriers, independently apply spectral shaping to each of the subcarriers, and obtain, based on the spectral shaping of each of the subcarriers, a sequence of assigned integers to supply to one or more DACs. In some implementations, the DSP 400 may generate the subcarriers using time domain filtering and frequency shifting by multiplication in the time domain.

The DAC may include one or more digital-to-analog converters. The DAC may receive the sequence of assigned integers and, based on the sequence of assigned integers, generate the voltage signals to apply to a modulator. A laser may include a semiconductor laser, such as a distributed feedback (DFB) laser, or some other type of laser. The laser may provide an output optical light beam to the modulator.

For example, as illustrated in FIG. 4, the DSP 400 includes various components for processing information bits 402. These components are used in an optical coherent modem using digital subcarrier multiplexed (SCM) signals. Digital SCM signals refer to a class of multi-carrier signals in which the optical spectrum of the overall TX signal can be sliced into multiple of smaller spectral components called subcarriers. The DSP 400 can digitally generate each of the subcarriers (SCs) and modulate each of the SCs independently using each of the various components. The components include, for example, one or forward error correction (FEC) encoders 404, one or more bit-to-symbol mappers 406, one or more non-linear pre-compensation per subcarrier circuitry 410, one or more subcarrier skew circuitry 412, one or more transmitter frontend pre-compensation pulse shaping and subcarrier muxing (TX FDEQ) circuitry 414, one or more of lane-to-lane skew correction circuitry 415, one or more interpolators 420, and one or more DACs 422.

In some implementations, the FEC encoder 404 can process the information bits from client 402. For example, the FEC encoders 404 can receive the incoming information bits from client 402 and can add redundant or overhead bits to protect the information bits during transmission. The FEC encoders 404 can apply one or more encoding schemes to protect the information bits. The DSP 400 then provides the encoded bits to the bit-to-symbol mapper 406. Specifically, the bit-to-symbol mapper 406 can extract a particular amount of encoded bits, e.g., $n_{SE}$ coded bits, and map the amount of encoded bits into one symbol from an alphabet of symbols that depends on the applied modulation format. For example, for 64-ary QAM modulation with an alphabet size of 64, every $n_{SE}$ coded bits=$\log_2 64$=6 bits are then mapped into one 64 QAM symbol per orthogonal polarization per subcarrier. Hence, the symbol (or baud) rate per subcarrier $f_{baud}$ can be calculated as $$f_{baud} = \frac{R_b}{N_{sc} * 2 * \log_2 M},$$

where $R_b$ is the total gross bit rate in gigabits (Gb)/s, $N_{sc}$ is the number of subcarriers, and M is the modulation alphabet size. The bit-to-symbol mapper 406 outputs $N_{sc}$ number of streams of symbols.

The one or more non-linear pre-compensation per subcarrier circuitry 410 can receive the number of streams of symbols from the bit to symbols mapper circuitry 406. The one or more non-linear pre-compensation per subcarrier circuitry 410 can pre-compensate the symbols with a total perturbation value using estimated non-linear coefficients $C_{m,n,i,j}[k]$ as determined by the DSP in receiver 306. In some cases, the receiver 306 can provide the estimated non-linear coefficients $C_{m,n,i,j}[k]$ to the DSP 400 over a back-channel, which is further described below. In some cases, for the pre-compensation method, a test signal can be sent from the transmitter 302 to the receiver 306 in order for the receiver 306 to determine the non-linear coefficients of the optical fiber channel 304 prior to the start of the transmitter 302 sending real data. The symbols or subcarriers are pre-compensated by subtracting the total perturbation value from each subcarrier so that when the symbols are transmitted and the optical fiber's perturbation or non-linearity is imparted or added to the symbols, then the overall perturbation noise can net to a value near to zero. This process will be further described below.

The one or more subcarrier skew circuitry 412 can receive the streams of symbols from the non-linear pre-compensation per subcarrier circuitry 410. The one or more subcarrier skew circuitry 412 can skew each of the streams of symbols in time relative to each other to pre-compensate the fiber chromatic dispersion applied on the link 304, or at least a portion of it. Depending on how much fiber chromatic dispersion, e.g., measured in ps/nm) is chosen to be pre-compensated, the amount of skew between the symbol streams belonging to two different subcarriers depends on the frequency between the subcarriers on a frequency spectrum. Moreover, the subcarrier skew block can compensate for the group velocity difference between different subcarriers as they propagate the fiber link due to chromatic dispersion.

The TX FDEQ 414 can receive the skewed streams of symbols from the one or more subcarrier skew circuitry 412. The TX FDEQ 414 can perform one or more processes to pre-compensate the chromatic-dispersion induced group delay different between the spectral components with each subcarrier bandwidth. In addition, the TX FDEQ 414 can pre-compensate the frequency response imperfections of the transmitter front-end components. For example, the TX FDEQ 414 seeks to pre-compensate the frequency response imperfections of the DACs 422, the RF drivers, the PIC, and other components that may affect the transmission. Moreover, the TX FDEQ 414 block can also perform Nyquist pulse shaping. By performing Nyquist pulse shaping on the symbols, the TX FDEQ 414 can ensure each subcarrier has a bandlimited pulse shape to reduce the amount of bandwidth required by each subcarrier during transmission. Similarly, the TX FDEQ 414 can perform subcarrier multiplexing. Subcarrier multiplexing can include, for example, frequency division multiplexing (FDM) of the $N_{sc}$ parallel streams by modulating each stream onto a digitally generated subcarrier to produce a spectrum of subcarriers on the frequency domain. The TX FDEQ 414 can output four parallel real-valued streams that represent the time domain samples that the DSP 400 will modulate the four components of the DP field, e.g., XI, XQ, YI, and YQ.

The lane-to-lane skew correction circuitry 416 can receive the four parallel real-valued streams that represent the time domain samples. Specifically, the lane-to-lane skew correction circuitry 416 can correct these symbols for any timing skews between the RF lanes in the DSP 400. The lane-to-lane gain imbalance correction circuitry 418 can receive the four parallel real-valued streams and correct for any power or amplitude gains between the RF lanes in the DSP 400.

The lane-to-lane gain imbalance correction circuitry 418 can output the gain corrected four parallel real-valued streams and provide the streams to the interpolate to DAC sampling rate circuitry 420. The interpolate to DAC sampling rate 420 can interpolate or re-sample these symbols to a particular rate that matches to the sampling rate of the DACs 422. Once the signals have been sampled to a rate that matches the sampling rate of the DACs 422, the signals are provided to the DACs 422 to be converted into four analog waveforms. These four analog waveforms can then be fed into the TX module shown in the transmitter 302.

Figure 5A:
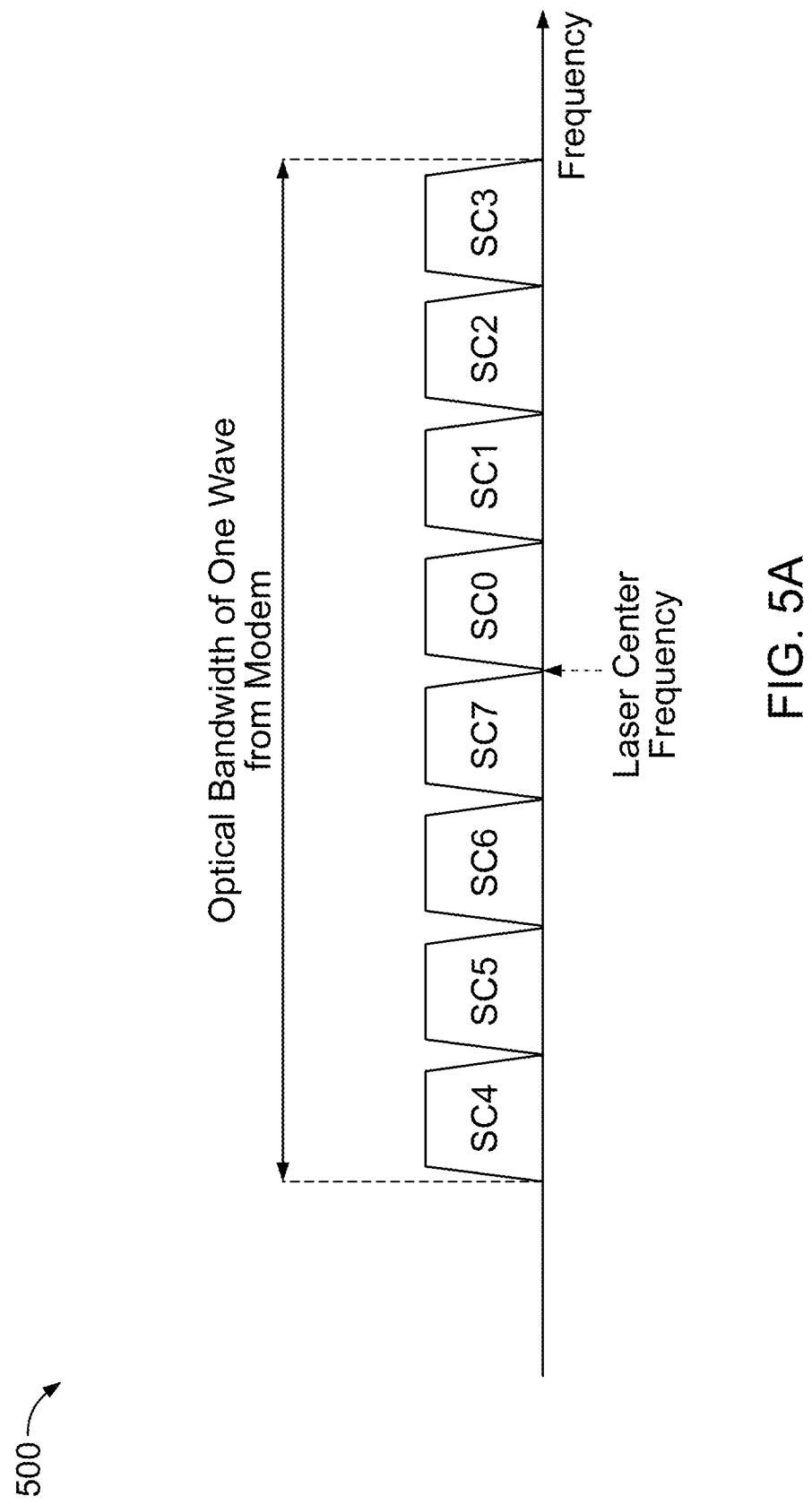
FIG. 5A is another diagram of optical subcarriers depicted over a frequency domain spectrum.

FIG. 5A is another diagram 500 of optical subcarriers depicted over a frequency domain spectrum. The optical subcarriers 500 include 8 subcarriers with a center frequency equal to the laser center frequency. The combined bandwidth of each subcarrier of the 8 subcarriers can be equivalent to the optical bandwidth of one wave from the transmitter 302. However, the optical subcarriers may include more subcarriers or fewer subcarriers than those illustrated in the diagram 500. SCM signals offer some benefits relative to single-carrier signals such as better tolerance to equalization enhanced phase noise (EEPN) and better jitter tolerance.

FIG. 5B is a diagram 501 of a single subcarrier depicted over a frequency domain spectrum. The bandwidth of the single subcarrier can be equivalent to the optical bandwidth of one wave from the transmitter 302. Moreover, the center frequency of the single subcarrier may be equivalent to the laser center frequency.

Figure 6:
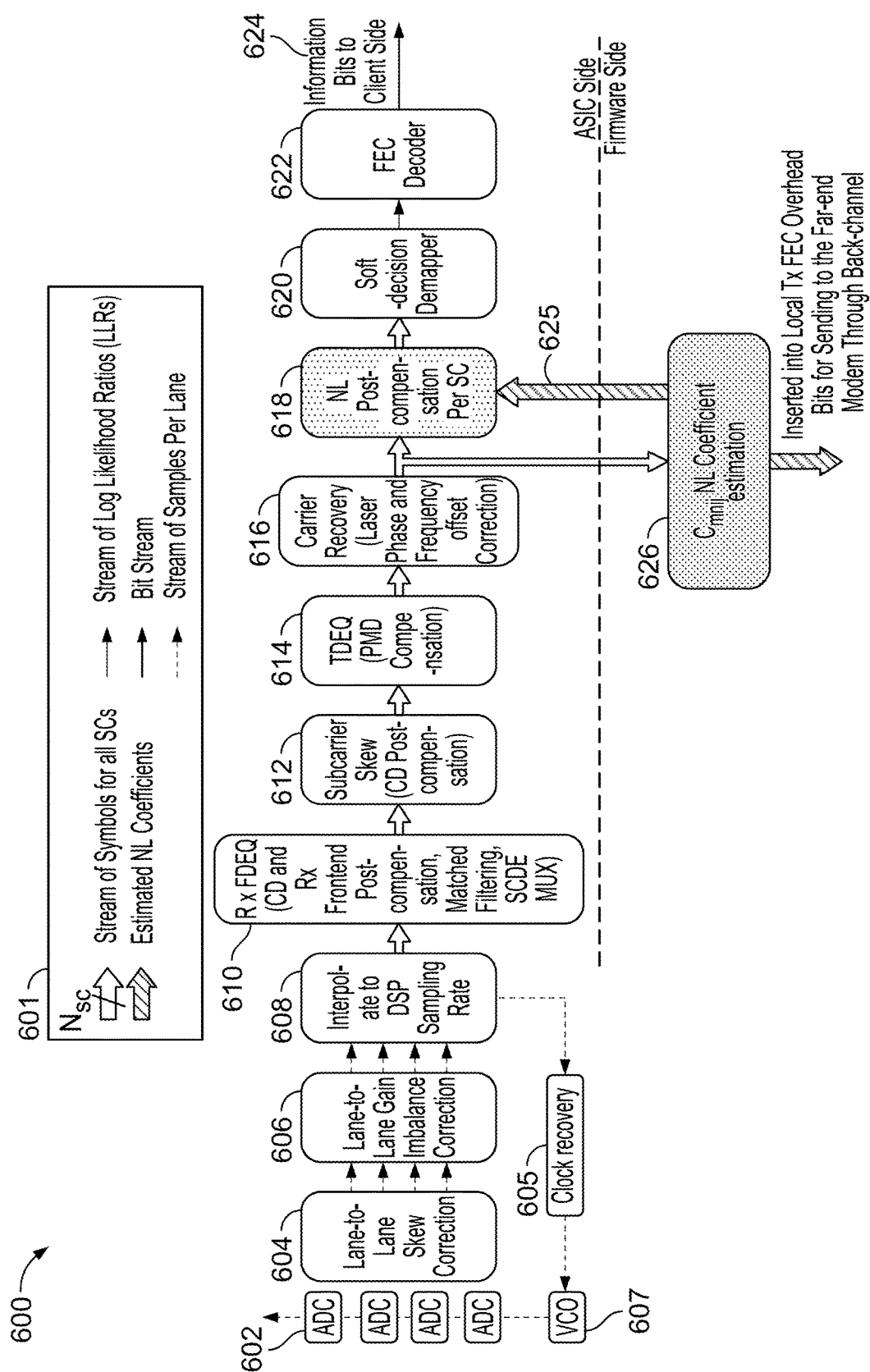
FIG. 6 is a block diagram of an example digital signal processor at a receiver.

FIG. 6 is a block diagram of an example digital signal processor 600 at a receiver. For example, the DSP 600 may be included within the coherent receiver 306 of the system 300. The DSP 600 may include various components for processing the received signals, as described below. FIG. 6 illustrates a legend 601 that illustrates the data flow of between components of the digital signal processor 600.

The DSP 600 may include one or more digital signal processors. The DSP 600 may receive input data over the optical fiber link and process the received input data to extract the bits. Specifically, the DSP 600 may process the received digital samples, corresponding to a respective subcarrier, to extract the data from the respective subcarrier. Moreover, each component in the DSP 600 can process the digital samples and correct for channel impairments, such as polarization mode dispersion, carrier recovery, or the like. In some implementations, the DSP 600 may de-skew the data to undo skew caused by the optical fiber link or any skew introduced by the DSP 400.

For example, as illustrated in FIG. 6, the DSP 600 includes various components for processing the incoming digital samples. These components are used in the digital SCM signals. The DSP 600 can generally receive, demodulate, correct, and extract bits from each of the SCs independently using various components. The components include, for example, one or more ADCs 602, one or more lane-to-lane skew correction circuitry 604, one or more lane-to-lane gain imbalance correction circuitry 606, one or more interpolate to DSP sampling rate circuitry 608, clock recovery 605, VCO 607, one or more receiver frontend post-compensation matched filtering and mux circuitry (RX FDEQ) 610, one or more subcarrier skew circuitry 612, one or more TDEQ circuitry 614, one or more carrier recovery circuitry 616, one or more non-linear post-compensation per subcarrier circuitry 618, one or more soft decision demapper circuitry 620, one or more FEC decoders 622, and one or more $C_{mnij}$ NL Coefficient Estimation circuitry 626.

In some implementations, the DSP 600 can operate on the incoming digital samples from the ADCs 602 in a similar but mirrored way to the TX DSP blocks. The lane-to-lane skew correction 604 and the lane-to-lane gain imbalance correction 606 can correct for timing skews and power or amplitude skews on the incoming digital samples, respectively. The interpolate to DSP sampling rate 608 can interpolate or re-sample these symbols to a rate that matches the sampling rate to be processed by the RX FDEQ 610. Once the symbols have been samples to the designated rate, the signals are provided to the RX FDEQ 610 for further processing.

In some implementations, the RX FDEQ 610 can receive the skewed streams of symbols from the one or more interpolate to DSP sampling rate circuitry 608. The RX FDEQ 610 can perform one or more processes to post compensate the remaining portion of the fiber chromatic dispersion. This includes, for example, post-compensating the remaining portion of the fiber chromatic dispersion which equals the total link chromatic dispersion minus the amount of chromatic dispersion that was pre-compensated at the transmitter 302. Moreover, the RX FDEQ 610 can post-compensate the analog frequency response of the RX frontend to post-compensate the frequency response imperfections of the receiver front-end components. For example, the RX FDEQ 610 seeks to post-compensate the frequency response imperfections of the ADCs, the TIAs, and each of the PICs. The RX FDEQ 610 may also perform matched filtering to match to the received signal. In some examples, matched filter may be one receiver filter in an additive white Gaussian noise (AWGN) channel. However, other matched filter types are possible. In some implementations, the RX FDEQ 610 can demultiplex the received signal samples into $N_{sc}$ streams representing each subcarrier.

In some implementations, the RX FDEQ 610 can output the $N_{sc}$ streams representing each subcarrier to the one or more subcarrier skew circuitry 612. The one or more subcarrier skew circuitry 612 can correct the chromatic dispersion-induced group delay difference between different subcarriers by skewing the streams relative to each other appropriately in time, similar to the one or more subcarrier skew circuitry 412 in the transmitter. In some implementations, the one or more subcarrier skew circuitry 612 can output the unskewed symbol streams to the time-domain adaptive equalizer (TDEQ) circuitry 614.

The TDEQ circuitry 614 can receive the streams as input and can perform post-compensation PMD to recover the transmitted orthogonal polarizations of each of the subcarriers. The TDEQ circuitry 614 can output the orthogonal polarizations of the subcarrier streams to the one or more carrier recovery circuitry 612. The one or more carrier recovery circuitry 616 aims to compensate the errors introduced by the laser in the transmitter DSP, such as errors due to laser phase and laser frequency offset. Afterwards, the carrier recovery circuitry 616 outputs the corrected symbols to the non-linear post-compensation per subcarrier 618.

At this point in the receiver DSP chain, the received symbols output by the carrier recovery circuitry 616 can be considered analogous to the transmitted symbols plus a noise value. A portion of this additive noise value originates from ASE added by EDFAs over the optical fiber and cannot be compensated due to its fully random nature. The other portion of the noise can be due to non-linearity effects, e.g., Kerr non-linearity distortion, due to signal-signal NL interaction, which may be partially compensated using NLC schemes.

The one or more non-linear post-compensation per subcarrier circuitry 618 can receive the symbols from the carrier recovery circuitry 616. The one or more non-linear post-compensation per subcarrier circuitry 618 can post-compensate the symbols with a total perturbation value using estimated non-linear coefficients $C_{m,n,i,j}[k]$ as determined by the one or more $C_{mnij}$ NL Coefficient Estimation circuitry 626. The symbols or subcarriers are post-compensated by subtracting the total perturbation value from each subcarrier after the receiver DSP 600 has received the subcarriers. In the post-compensation method, the subcarriers are not pre-compensated with perturbation values at the transmitter side. As such, the receiver DSP 600 can subtract off the total perturbation value for the received symbols (and for subsequent received symbols) using the estimated NL coefficients determined by the one or more $C_{mnij}$ NL Coefficient Estimation circuitry 626 to correct the non-linear impairments imparted by the optical fiber. In the pre-compensation method, the non-linear post-compensation per subcarrier circuitry 618 is not applied. This process will be further described below.

The output of the non-linear post-compensation per subcarrier 618 is provided to the soft-decision demapper circuitry 620. The soft-decision demapper circuitry 620 can extract or demap soft information about the bits from the received noisy symbols. Typically, the soft-decision demapper circuitry 620 extracting or demapping soft information about the bits indicates likelihood values of each bit being either a value of '1' or a value of '0'. In response to processing of the noisy symbols as bits or likelihood of bits, the soft-decision demapper circuitry 620 outputs the bits to the FEC decoder 622.

The FEC decoder 622 can perform one or more processes to improve the likelihood values on the extracted bits. For example, the FEC decoder 622 can apply one or more FEC decoder algorithms, depending on the type of FEC encoder algorithm applied at the transmitter, to correct bit errors and to remove bit redundancy. Afterwards, the FEC decoder 622 can output the information bits to the client side 624 for their review.

Figure 7:
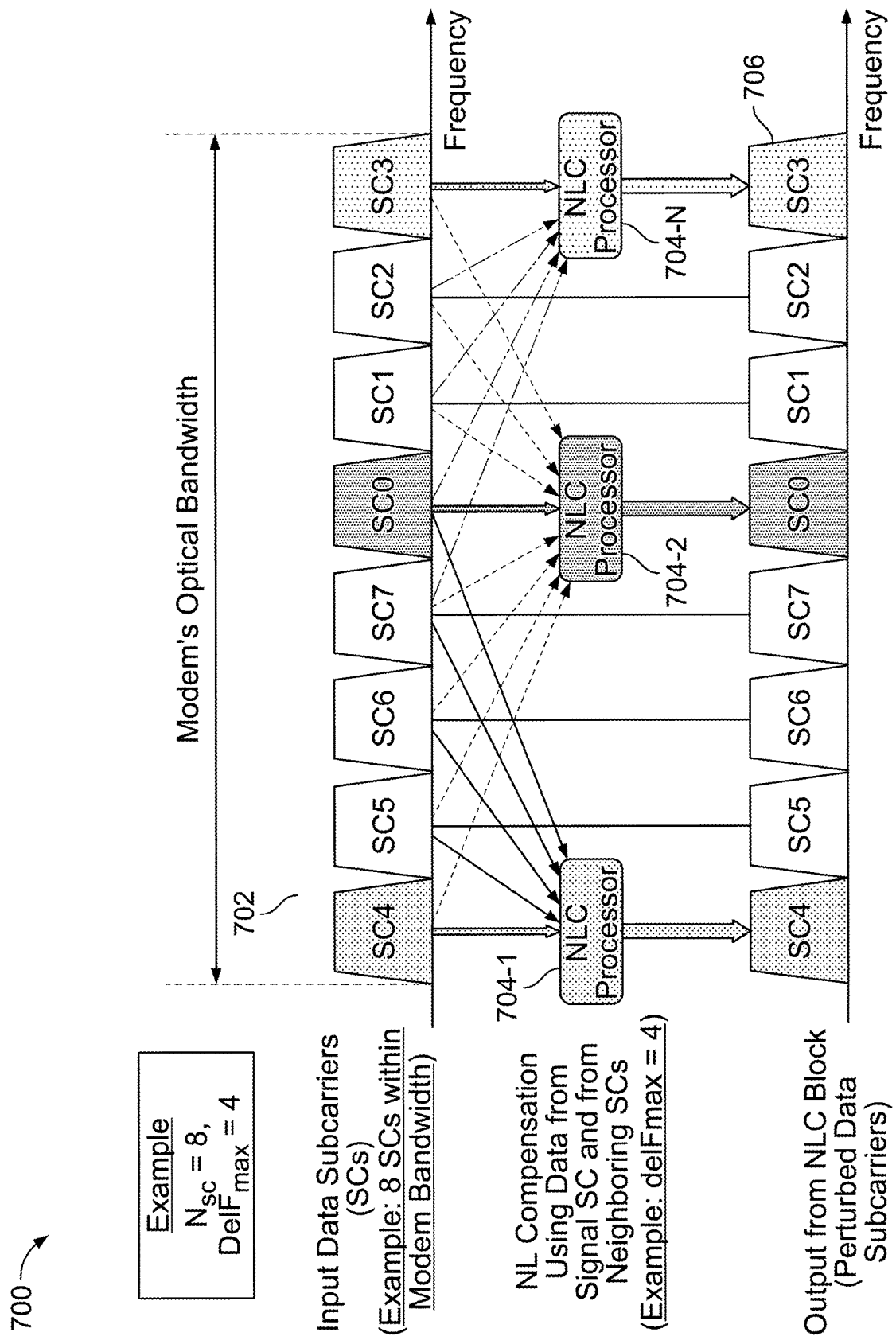
FIG. 7 is a block diagram of an example perturbative-based non-linear coding scheme for digital subcarrier multiplexing.

FIG. 7 is a block diagram 700 of an example perturbative-based non-linear coding scheme for digital subcarrier multiplexing. The block diagram 700 includes various subcarriers 702 that are processed by one or more NLC processors 704-1 through 704-N to account for the non-linearity effects imparted on the subcarriers by the channel. For example, each of the NL pre-compensation per subcarrier 410 and the NL post-compensation per subcarrier 618 can be an example of one NLC processor of the NLC processors 704-1 through 704-N. The block diagram 700 illustrates 8 subcarriers, but more or fewer subcarriers can be used in different examples.

In some implementations, a DSP-based non-linear compensation (NLC) scheme seeks to mitigate Kerr nonlinearity from optical fiber channels. One such NLC algorithm includes digital back-propagation (DBP), for example. DBP can be implemented in the transmitter and/or the receiver side. If DBP is implemented on the RX side, the RX DSP aims to undo the non-linearity signal-to-signal interaction by propagating the received samples through a "fictious" model of the optical fiber link in the backward direction. The mathematical operations required to perform DBP are similar to simulating the fiber itself in the forward direction and requires the use of split-step Fourier method (SSFM).

In DBP using SSFM, the link can be broken into suitable short sections or steps (e.g., one DBP step per span), where at each step the CD accumulated per step is compensated in the frequency domain, and the NL distortion per step is compensated in the time domain in a lumped fashion. Hence, each DBP step can be performed through an FFT/IFFT operation to go back and forth between frequency and time domains. Despite the theoretically large NLC gains that can be achieved by DBP, especially if performed over a wide optical bandwidth, e.g., multi-channel DBP, DBP can be complex to implement in practice. DBP can be burdensome because of the computational complexity required to implement many DBP steps, which can require an FFT/IFFT per step and the significant changes necessary to be made to the standard RX DSP chain, in which chromatic dispersion is typically compensated in one-shot by the RX FDEQ 610. Second, DBP requires the knowledge of knowing many link parameters to be able to simulate the link in a backward direction. These parameters include, for example, span lengths, fiber type per span, and power profile over all the spans.

In practice, a modem may not have knowledge about these link parameters and may have to make assumptions when implementing DBP which in turn reduces the practical DBP gain from the achievable gains reported in simulations. Other reasons that impact practical DBP performed include PMD and its impact on the optical bandwidth of the signal that can be back propagated and the amount of digital oversampling for the signal that is back propagated.

Other types of NLC algorithms can be based on perturbation theory. Perturbation theory can be implemented using perturbation-based NLC schemes. Within the perturbation framework, the fiber can be treated as a quasi-linear medium, which assumes the fiber is linear, e.g., compensates only the linear impairments such as CD and PMD. The NL distortion can be assumed to be small and can be modeled as an additive "noise" term to the already obtained linear solution. The Manakov equation that governs propagation inside a single mode fiber can be written for the x-polarization component of the DP field at time t and position z along the fiber, denoted by $u_x(t,z)$, $$\frac{\partial}{\partial x} u_x(t,z) + \frac{i\beta_2}{2} * \frac{\partial^2}{\partial t^2} * u_x(t,z) = \qquad (1)$$
$$i * \frac{8}{9} * \gamma p(z) \left[ |u_x(t,z)|^2 + |u_y(t,z)|^2 \right] u_x(t,z)$$

where $\beta_2$ is related to the fiber dispersion parameter D in picosecond/(nanometer*kilometer) (ps/(nm·km)) as $$\beta_2 = \frac{-\lambda^2}{2\pi c} D$$

where $\lambda$ is the center wavelength and c is the speed of light in a vacuum. In equation 1, p(z) denotes the average power profile as a function of z and $\gamma$ is the Kerr NL parameter of the fiber. $\Gamma$ is inversely proportional to the effective area $A_{eff}$ of the fiber meaning that the NL effects will be more significant for fibers with smaller effective area, e.g., more mode confinement.

In some examples of the perturbation approach, $\gamma=0$ can be set in the Manakov equation effectively eliminating the NL term. A linear solution can be obtained at every point along the link $u_{lin,x}(t,z)$. Then, the NL distortion can be modeled as an additive noise term $\Delta u_x$ to obtain the complete solution as the following:

$$u_x(t,z) = u_{lin,x}(t,z) + \Delta u_x(t,z) \quad (2)$$

For each $u_x(t,z)$ in the left hand side of equation 1, equation 2 is substituted and for each $u_x(t,z)$ and $u_y(t,z)$ in the right hand side of equation 1, using the linear solution only as $u_{lin,x/y}(t,z)$, the following partial differential equation (PDE) in $\Delta u_x(t,z)$ can be obtained:

$$\frac{\partial}{\partial x}u_x(t,z) + \frac{i\beta_2}{2}\frac{\partial^2}{\partial t^2}\Delta u_x(t,z) = \\ i\frac{8}{9}\gamma p(z)\big[|u_{lin,x}(t,z)|^2 + |u_{lin,y}(t,z)|^2\big]u_{lin,x}(t,z) \quad (3)$$

The PDE in equation 3 can be solved by first transforming into the frequency domain:

$$\frac{\partial}{\partial x}\Delta u_x(\omega,z) - \frac{i\beta_2\omega^2}{2}\Delta u_x(\omega,z) = \\ i\frac{8}{9}\gamma p(z)x\mathcal{F}\big\{[|u_{lin,x}(t,z)|^2 + |u_{lin,y}(t,z)|^2]u_{lin,x}(t,z)\big\} \quad (4)$$

where $\mathcal{F}\{\cdot\}$ denotes the Fourier transform of the quantity inside the curly brackets. If the linear solution $$u_{lin,\frac{x}{y}}(t,z)$$

in equation 4 is replaced by the convolution sum of the transmitted symbols on x/y polarizations with the pulse shape g(t,z) at general position z, which includes the CD-induced broadening (ISI) in the pulse shape up to point z, as in:

$$u_{lin,\frac{x}{y}}(t,z) = \sum_m A_{m,\frac{x}{y}} g(t-mT,z) \quad (5)$$

where $A_{m,x/y}$ are the transmitted symbols on x/y polarizations at time instant mT where T is the symbol duration and $m \in \{0, 1, 2, \ldots\}$ is the discrete time index. Solving the inhomogeneous PDE in equation 4 while plugging in the pulse train summation from equation five, the following time domain solution of the perturbation on l-th symbol in x-polarization which models the total NL distortion at the end of the link (at z=L):

$$\Delta u_x(t=lT,L) = \Sigma_{m,n}C_{mn}(A_{n+l,x}A^*_{m+n+l,x}A_{m+l,x} + A_{n+l,y}A^*_{m+n+l,y}A_{m+l,x}) \quad (6)$$

where the "NL coefficients" $C_{mn}$ are calculated as the following:

$$C_{mn} = i\frac{8}{9}\gamma \quad (7)$$

$$\int_0^{L_{tot}} dz p(z) \int_{-\infty}^{\infty} dt * g^*(t,z) * g(t-mT,z)g(t-nT,z)g^*(t-(m+n)T,z)$$

As illustrated in the equations above, the $C_{mn}$ coefficients depend on the pulse shape evolution along the fiber, e.g., depends on CD, as well as the average power profile along the optical fiber link. By knowing the pulse shape and the launch power from the transmitter g(t,z=0) which for example, can be a raised cosine (RCOS) Nyquist pulse shape, the pulse shape can be calculated at every point z along the fiber by applying the CD in the frequency domain and transforming back into time domain. The equation below can represent the transformation back to the time domain as $$g(t,z) = \mathcal{F}^{-1}\left\{\mathcal{F}\{g(t,z=0)\}xe^{\frac{-i\beta_2\omega^2 z}{2}}\right\} \quad (8)$$

Equation 8 can then be used in equation 7 to perform the integrals over t and z and obtain $C_{mn}$ for a certain link analytically. Other approaches may rely on calculating analytically $C_{mn}$ coefficients using equation 7. Another approach can use a perturbation-based NLC for a dual-carrier signal, e.g., with two subcarriers. The coefficients can also be calculated analytically in that case while considering two types of NL interactions: intra-SC NL and inter-SC NL interference from one subcarrier onto the other subcarrier. Like other perturbation-based NLC work for single-carrier signals, calculating the $C_{mn}$ coefficients analytically using equation 7 may not be practical since it requires the knowledge of the exact power profile, the span lengths, the fiber parameters per span, and other parameters to perform the integrals.

As such, this disclosure describes a perturbative-based NLC scheme for digital subcarrier multiplexed (SCM) signals with $N_{sc}$ subcarriers. The general framework presented covers all types of NL interactions between the subcarriers including intra-SC and inter-SC categories, up to the first order approximation within the perturbation framework. In some implementations, pre-compensating the NL distortion is performed at the transmitter. In some implementations, post-compensating the NL distortion is performed at the receiver. In some implementations, the NL coefficients can be estimated "blindly" at the Rx in a decision directed approach without knowledge of the exact link parameters. The scheme also works for a wide range of links including dispersion-unmanaged links, where optical dispersion compensation (ODC) is not used, as well as legacy dispersion managed links, where ODC is used.

For a digital SCM signal with $N_{sc}$ subcarriers, the total time-domain perturbation on the l-th symbol in x-polarization at the end of the link on signal SC k will be denoted by $\Delta u_x(t=lT,L)[k]$ or $\Delta u_{l,x}[k]$ for brevity. The quantity inside the square brackets denotes the particular subcarrier for which the perturbation is calculated. Moreover, $\Delta u_{l,x}[k]$ can be calculated as the following:

$$\Delta u_{l,x}(k) = \Sigma_{i,j}\Sigma_{m,n}C_{mnij}(A_{n+l,x}[i]A^*_{m+n+l,x}[j]A_{m+l,x}[v] + A_{n+l,y}[i]A^*_{m+n+l,y}[j]A_{m+l,x}[v]) \quad (9)$$

In equation 9 above, $A_{m,x/y}[q]$ denotes the m-th transmitted symbol in the x/y polarization of subcarrier q. If equation 9 is compared with equation 6 for the single carrier case, for a SCM signal, there is an additional summation over i,j that covers all possible subcarrier pairs within the SCM signal. For both equations 6 and 9, the symbols involved in each product inside the summation is called "triplet" as is contains a product of three symbols at different time instances. The main difference in the SCM case in equation 9 compared to the single carrier case in equation 6 is that each triplet contains symbols drawn from three different subcarriers, namely SCs (i,j,v). This physically means that there can be non-linear interaction between symbols modulated on three different subcarriers (i,j,v) that generates NL distortion at a new frequency component that lies inside the bandwidth of a fourth subcarrier k. In the context of non-linear optics, this process is called four-wave mixing (FWM) and the frequencies of the four involved photons in this NL interaction have to satisfy the law of conversation of energy. Hence, the frequencies of the four involved subcarriers typically satisfy the following equation:

$$f_v = f_j - f_i + f_k \quad (10)$$

Knowing this governing relationship between the subcarriers involved in the non-linear interaction of equation 10, the process of evaluating the perturbation in equation 9 now involves performing the double summation on every possible subcarrier pair i,j from all possible combinations within the SCM signal bandwidth, i.e. i,j∈{0, 1, ..., $N_{sc}$−1}. For each selected pair i,j, a third subcarrier involved is calculated in the triplet v using equation 10, such that the resulting nonlinear distortion falls into the signal subcarrier k. This process is then repeated for each signal subcarrier k.

Finally, the last key difference in equation 9 from the single carrier case in equation 6 lies in the non-linear coefficients. Instead of having two indices m,n to denote the $C_{mn}$ coefficients in the single carrier case, the notation for the SCM signals is extended to $C_{m,n,i,j}[k]$, where m,n denotes the discrete time indices of the symbols involved in the triplet and i,j denote the interfering SC pair, and k denotes the signal SC from which the perturbation will be subtracted.

System 700 illustrates a top-level view of the perturbative NLC (PNLC) scheme for a digital signal with eight subcarriers. Other numbers of subcarriers are also possible. In the example of system 700, eight subcarriers are within the modem's optical bandwidth and any subcarriers lying outside the modem's optical bandwidth which may have co-propagated with the signal along the fiber, i.e., from a neighboring WDM wave, is not accessible to the NLC circuit on the DSP-ASIC.

In system 700, the perturbative NLC scheme relies on one NLC processor 704-1 through 704-N (collectively referred to as "NLC processor 704) for each signal subcarrier (denoted by k above). Each NLC processor 704 accepts the symbols on the signal subcarrier k itself as well as from up to a delta frequency maximum, e.g., ±delF$_{max}$, neighboring subcarriers around the signal subcarrier. In the example of system 700, the ±delF$_{max}$ is chosen to be a value of 4. A value of 4 means that every NLC processor accepts the symbols from up to four neighbors on each side of the signal subcarrier, assuming the subcarriers fall within the modem's optical bandwidth. Generally, the ±delF$_{max}$ can determine how much optical bandwidth the PNLC scheme covers when compensating the inter-subcarrier nonlinear distortion. Each NLC processor 704 can calculate the perturbation that is subtracted from the symbols on x and y polarizations of subcarrier k, according to equation 9, while using the knowledge of the symbols from neighboring subcarriers lying within the modem's bandwidth.

For example, as illustrated in system 700, the NLC processor 704-1 can receive subcarriers 4, 5, 6, 7, and 0. NLC processor 704-2 can receive subcarriers 4, 5, 6, 7, 0, 1, 2, 3. NLC processor 704-N can receive subcarriers 7, 0, 1, 2, 3. As mentioned, the number of subcarriers that NLC processor can receive is dictated by the ±delF$_{max}$ value. Each NLC processor 704-1 through 704-N can process the corresponding subcarriers to determine the perturbations to be subtracted from the x and y polarization symbols on the subcarrier. As such, the output of NLC processor 704-1 is subcarrier 4, the output of NLC processor 704-2 is subcarrier 0, and the output of NLC processor 704-N is subcarrier 3. The output subcarriers 706 have their perturbations subtracted in order to be offset to a net of zero when transmitted over the fiber or received at the receiver, depending on where the PNLC scheme is occurring. In some cases, the subcarriers have non-overlapping frequencies on the frequency axis. These subcarriers can be tightly spaced, e.g., no gaps between subcarriers, or include one or more guard bands between the subcarriers.

In some implementations, the PNLC circuit can be placed at the transmitter DSP. For example, if the PNLC circuit is placed in the TX DSP, such as that shown in DSP 400 of FIG. 4, the input symbols to the NL pre-compensation per subcarrier circuitry 410 are the transmitted symbols on each subcarrier. In such a case, the NL distortion can be pre-compensated by subtracting the calculated perturbations from the transmitting symbols to produce the output pre-distorted symbols from the PNLC circuit.

In some implementations, the PNLC circuit can be placed in the receiver DSP. In this manner, when the PNLC circuit is placed in the RX DSP, the PNLC circuit is used to post-compensate for the NL distortion. For example, as shown in the DSP 600 of FIG. 6, the input symbols to the NL post-compensation per subcarrier circuitry 618 are the Rx symbols at the output of the carrier recovery circuitry 616, i.e., after all the linear impairments have been compensated in the preceding RX DSP circuitry blocks, e.g., 602-614.

In some implementations, a system designer can decide whether to use the PNLC circuit in the transmitter DSP chain, e.g., pre-compensation, or the receiver DSP chain, e.g., post-compensation. Specifically, the system designer can decide whether to use the "soft" noisy values of the input Rx symbols to the PNLC circuit if the PNLC circuit is incorporated in the receiver or to use the "hard" decision values if the PNLC circuit is incorporated in the transmitter, such as the perturbations calculated according to equation 9.

Figure 8:
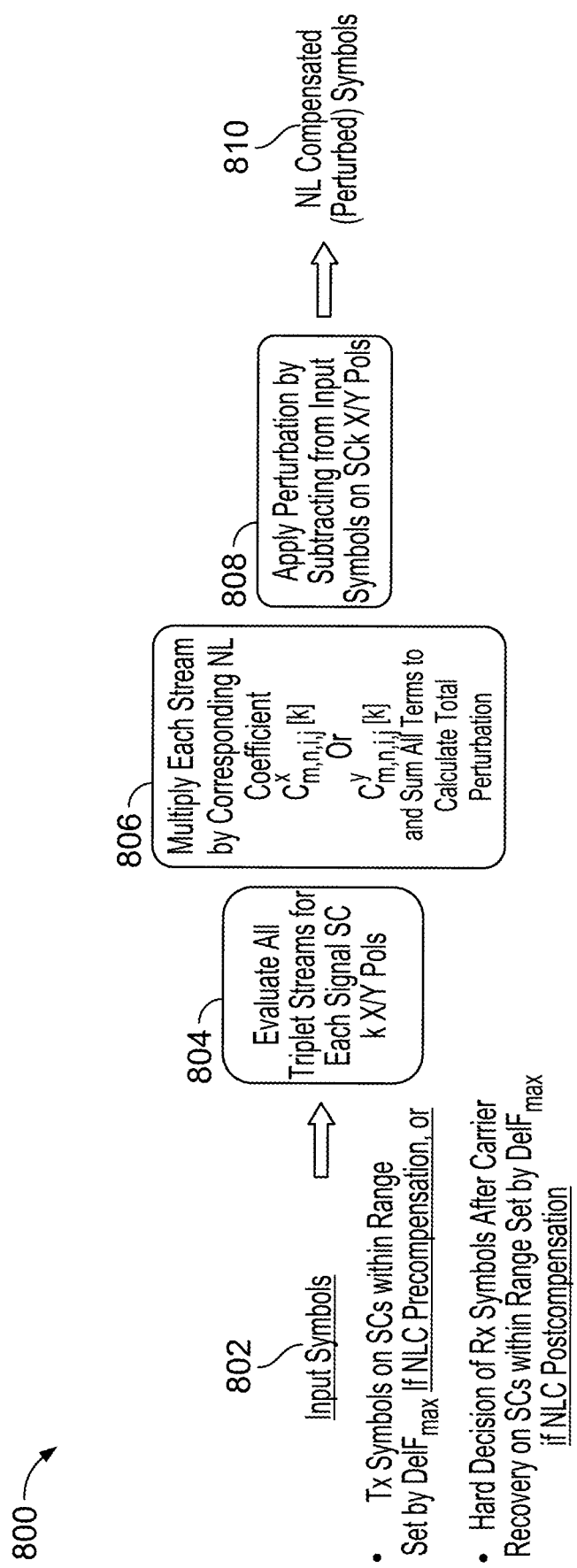
FIG. 8 is another block diagram of an example perturbative-based non-linear coding scheme for digital subcarrier multiplexing.

FIG. 8 is another block diagram 800 of an example perturbative-based non-linear coding scheme for digital subcarrier multiplexing. Specifically, the block diagram 800 illustrates the operations performed by each NLC processor. For example, the block diagram 800 illustrates the operations by each NLC processor 704 from FIG. 7. Specifically, the NLC processor can evaluate the triplets by multiplying the symbols from three subcarriers (i,j,v) at different time instants or lags. Then, the NLC processor can multiply the triplet symbols by the corresponding NL coefficients $C_{m,n,i,j}[k]$ obtained from estimation, which will be described below. The determined NL coefficients can determine the strength of the contribution of each triplet to the total perturbation or distortion that is to be subtracted from the original symbols at the end.

For example, as illustrated in system 800, input symbols 802 can be provided to the NLC processor. The input symbols 802 can include one of two sets of symbols. If the NLC processor is incorporated on the TX DSP chain and being used for NLC pre-compensation, then the input symbols 802 can include TX symbols on subcarriers within range of one another set by the value of ±delF$_{max}$. On the other hand, if the NLC processor is incorporated on the RX DSP chain and being used for NLC post-compensation, then the input symbols 802 include hard decision of RX symbols after carrier recovery on subcarriers within range of one another set by the value of ±delF$_{max}$ on the receiver.

These input symbols 802 can be provided to the NLC processor, where the NLC processor can perform in 804 an evaluation of each triplet streams for each subcarrier signal k for x and y polarizations. Then, the NLC processor can multiply the triplet symbols by the corresponding NL coefficients C$_{m,n,i,j}$[k] obtained from estimation. The NL coefficients applied depend on whether the triplet symbols correspond to the x polarization or they polarization. In response to calculating the triplet symbols by the corresponding coefficients, the NLC processor can sum all the terms to calculate the total perturbation or distortion.

In response to calculating the total perturbation, the NLC processor can apply the total perturbation for the selective subcarriers. For example, the NLC processor can subtract the total perturbation for each of the input symbols on the subcarriers to be transmitted or after the subcarriers have been received. Each of the subcarriers have values that are adjusted by the perturbation. In response, the NLC processor can output the NL compensated or NL perturbed symbols 810. The NL compensated or NL perturbed symbols 810 have now been adjusted for the non-linearity effects of the optical fiber.

Figure 9:
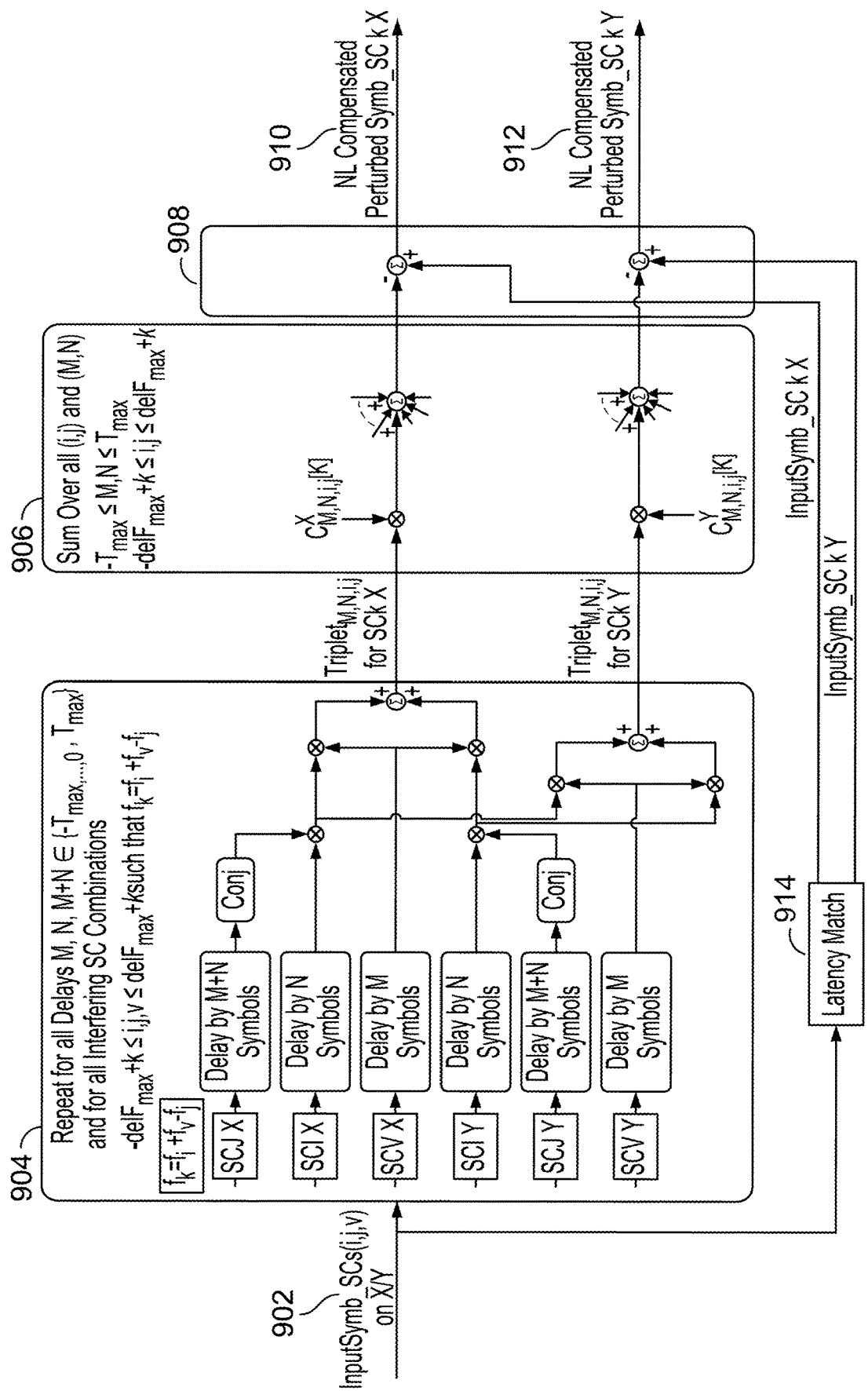
FIG. 9 is another block diagram of an example perturbative-based non-linear coding scheme for digital subcarrier multiplexing.

FIG. 9 is another block diagram 900 of an example perturbative-based non-linear coding scheme for digital subcarrier multiplexing. In the block diagram 900, a total perturbation can be calculated using a single subcarrier. For example, a single NLC processor for signal subcarrier k can show how a specific triplet at time instants (lags) M, N, M+N can be calculated, scaled by the corresponding NL coefficient, and finally summing all scaled triplets to form the total perturbation and subtracting the total perturbation from the input symbols.

As shown in block diagram 900, a single NLC processor for signal subcarrier k can include processing blocks 904, 906, 908, and 914. The input symbols 902 on the x and y polarizations from ±delF$_{max}$ neighboring subcarriers can be relative to the signal subcarrier k feed the NLC processor. For example, processing block 904 can receive the input symbols 902 for a signal subcarrier k and can perform the single triplet calculation using the input symbols 902. Specifically, the processing block 904 can evaluate the summation of equation 9, and more specifically, the specific time lags where n=N and m=M. For example, the processing block 904 can perform the processes that should be repeated for n, m, n+m∈{−T$_{max}$, . . . , −1, 0, 1, . . . , T$_{max}$} where T$_{max}$ is the maximum CD-induced walk-off (in symbols) the fiber channel introduces between the signal subcarrier k and the subcarrier k=delF$_{max}$. More specifically:

$$T_{max} = delF_{max} * \frac{f_{baud}(1+\alpha)}{125*10^9} * D_{tot}\left[\frac{ps}{nm}\right] * 10^{-12} * f_{baud} \tag{11}$$

In equation 11, f$_{baud}$ is the subcarrier baud rate in Hz, α is the roll-off factor of the RCOS Nyquist pulse shape, and D$_{tot}$ is the total fiber dispersion in ps/nm. In addition, the process performed in the processing block 904 can be performed repeatedly for all subcarrier combinations (i,j,v) ∈ {k−delF$_{max}$, . . . k, . . . , k+delF$_{max}$} that satisfy the four-wave mixing equation 10, shown above. The processing block 904 can be repeatedly performed for all terms in the two double summation shown in equation 9.

Next, the NLC processor can output each triplet value from the processing block 904. In processing block 906, the NLC processor can scale each triplet value by the corresponding NL coefficient C$_{m,n,i,j}$[k]. For example, the triplet$_{m,n,i,j}$ for subcarrier X can be scaled by the corresponding coefficient C$_{m,n,i,j}$$^x$[k]. Similarly, the triplet$_{m,n,i,j}$ for subcarrier Y is scaled by the corresponding coefficient c$_{m,n,i,j}$$^y$[k].

Next, the NLC processor can sum together the scaled triplets to generate a total perturbation signal for the x/y polarizations. In response, the x/y perturbations can be subtracted from the original input symbols on x/y polarization of subcarrier k to generate the output of the NLC processor. The latency match 1914 can provide the lagged input signal to the processing block 908. Then, in processing block 908, the NLC processor can subtract the corresponding perturbed scaled triplet values from the lagged input signal. As a result, the processing block 908 can output the NL compensated perturbed symbol k for X polarization 910 and the NL compensated perturbed symbol k for Y polarization 912 based on the result of the subtraction.

Figure 10:
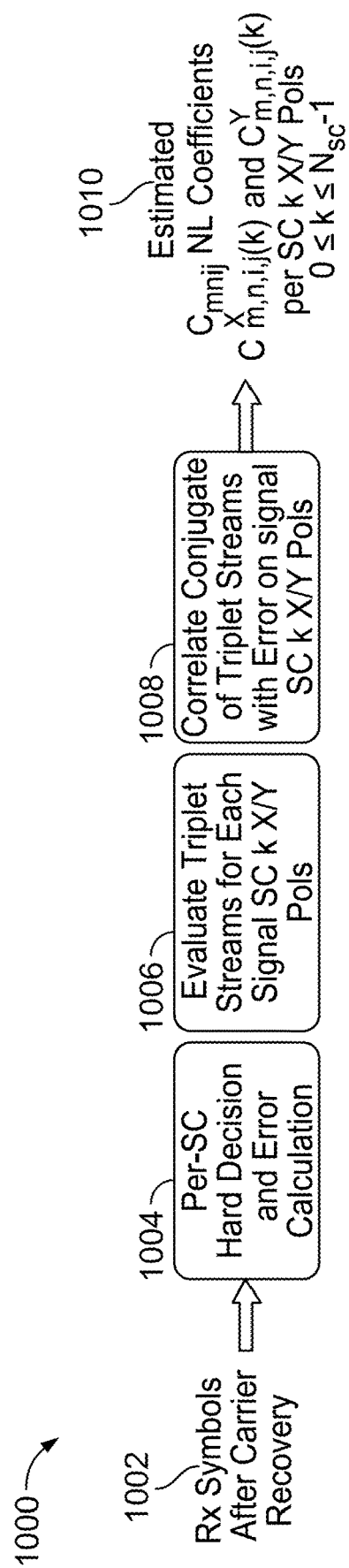
FIG. 10 is a block diagram of example perturbative-based non-linear coding scheme for estimating non-linear coefficients.

FIG. 10 is a block diagram 1000 of example perturbative-based non-linear coding scheme for estimating non-linear coefficients. Specifically, the block diagram 1000 illustrates operations performed for estimating the non-linear coefficients to be applied to the symbols for determining the total perturbation amount. The block diagram 1000 can be performed on the RX DSP chain in a receiver.

The operations illustrated in FIG. 10 can provide a high-level diagram of an algorithm to estimate the non-linear coefficients C$_{m,n,i,j}$[k]. For example, the algorithm includes various operations 1002, 1004, 1006, 1008, and 1010 which can be performed in the order indicated, in a different order, include fewer stages, and include more stages. The process shown in the diagram 1000 can be executed at the receiver by processing the received symbols output by the carrier recovery circuitry 616 in FIG. 6.

In some implementations, the coefficient estimation algorithm can be implemented on the RX DSP ASIC itself in real-time or near real-time. In some implementations, the coefficient estimation algorithm can be implemented on the RX DSP firmware that processes offline snapshots captured of the receive symbols output by the carrier recovery circuitry 616 in FIG. 6. Once the NL coefficients have been estimated, the NL coefficients can be used to configure the PNLC circuit on the same RX DSP if NL post-compensation is employed. This is illustrated by the C$_{mnij}$NL Coefficient estimation 626 and the corresponding line 625 provided back to the NL post-compensation per subcarrier 618 as shown in FIG. 6. In some implementations, the NL coefficients can be used to configure the PNLC circuit on TX DSP if NL pre-compensation is employed. If NL pre-compensation is employed, the NL coefficients can be transmitted through a "back-channel" to the far-end modem to be used to configured the PNLC circuit on the far-end's TX DSP. This "back-channel" process can be described with respect to FIG. 11.

Figure 11:
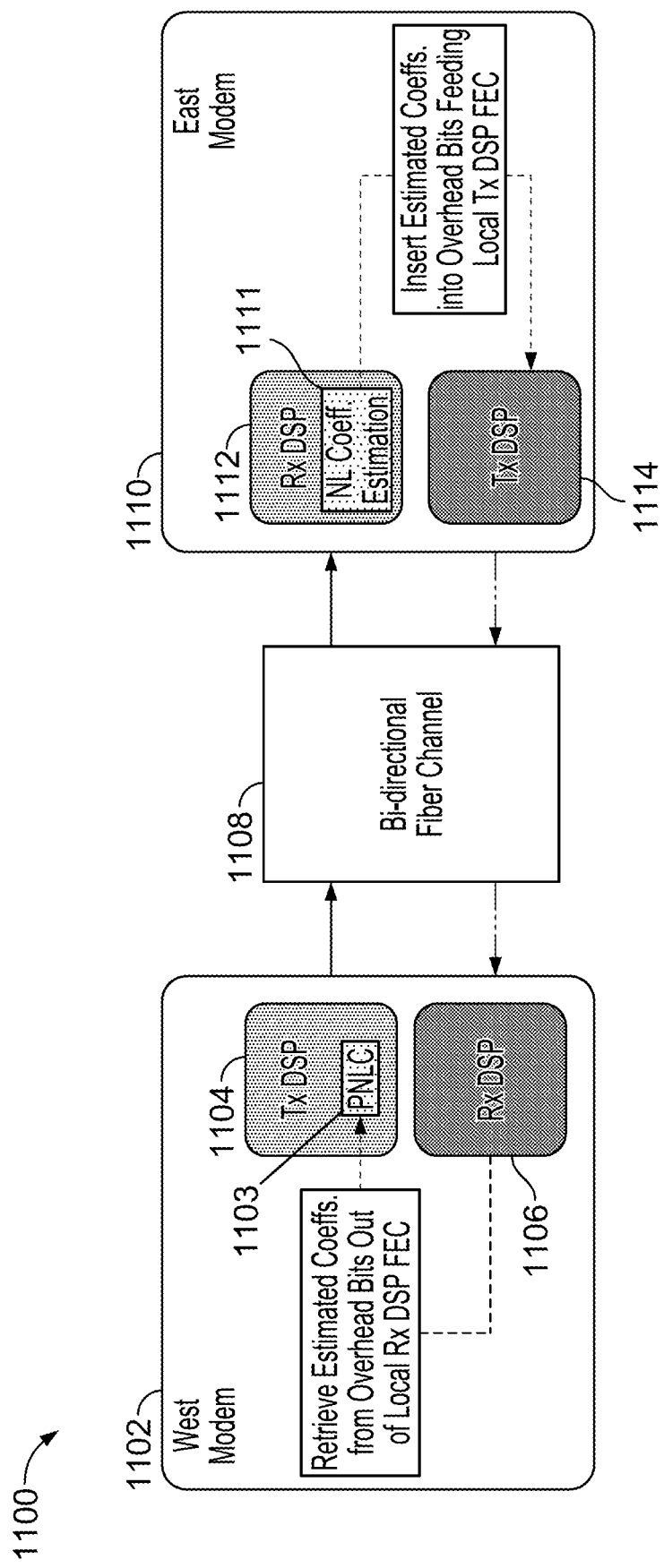
FIG. 11 is a block diagram of an example perturbative-based non-linear coding scheme for bi-directional communications.

For example, FIG. 11 illustrates the data-flow through a "back-channel" and how the "back-channel" is used to transmit the estimated NL coefficients from the modem 1110 to the modem 1102 on the other side of the bi-directional fiber channel 1108. In the example shown in FIG. 11, a west modem 1102 can communicate with an east modem 1110 over a bi-directional fiber channel 1108. The west modem 1102 can include a TX DSP 1104 and an RX DSP 1106. The east modem 1110 can include an RX DSP NL coefficient estimation 1111, where the NL coefficients are estimated. The TX DSP 1104 in the west modem can include a PNLC processor 1103, as does the RX DSP 1112.

FIG. 11 can include configuring the PNLC circuit 1103 in the TX DSP 1104 of the west modem for pre-compensation of the non-linear coding scheme. Initially, the coefficient estimation algorithm can operate in the NL coefficient estimation 1111 in the RX DSP 1112 of the east modem using the received symbols output from the carrier recovery circuitry in the RX DSP 1112. Since FIG. 11 is configured for pre-compensation of the non-linear coding scheme, the east modem 1110 can insert the estimated coefficients into the overhead bits of the east modem 1110's TX DSP 1114 to be sent back to the west modem 1102 and received by the RX DSP 1106. In some examples, the TX DSP 1114 may send the estimated coefficients to the RX DSP 1106 on the west modem 1108 in a manner separate from the bi-directional fiber channel 1108 to preclude any non-linear or linear effects being imparted onto the estimated coefficients. The estimated coefficients may be sent through higher TCP layers, through firmware, through SMS messaging, or other messaging types, in this manner.

As a result, the RX DSP 1106 at the west modem 1102 can receive the estimated coefficients from the east modem. In some examples, the west modem 1102 can retrieve the estimated coefficients from overhead bits out of the RX DSP 1106 FEC. In some examples, the west modem 1102 can retrieve the estimated coefficients in other manners. The west modem 1102 can then apply the received estimated coefficients to the PNLC 1103 in the TX DSP 1104 to use for future communications with the east modem 1110. In this manner, the TX DSP 1104 can apply the perturbations to the symbols prior to their transmission across the bi-directional fiber channel 1108, such as by subtracting the calculated perturbations from the symbols. Thus, when the TX DSP 1104 transmits the symbols with the subtracted perturbations over the bi-directional fiber channel 1108 to the east modem 1110, the bi-directional fiber channel 1108 can likely add or impart the perturbations. When the RX DSP 1112 receives the symbols, the effect of the perturbation may have a net value of zero or close to zero, which ultimately improves the reception of symbols by the east modem 1110 and the extraction of bits for meaningful and effective communication.

Figure 12:
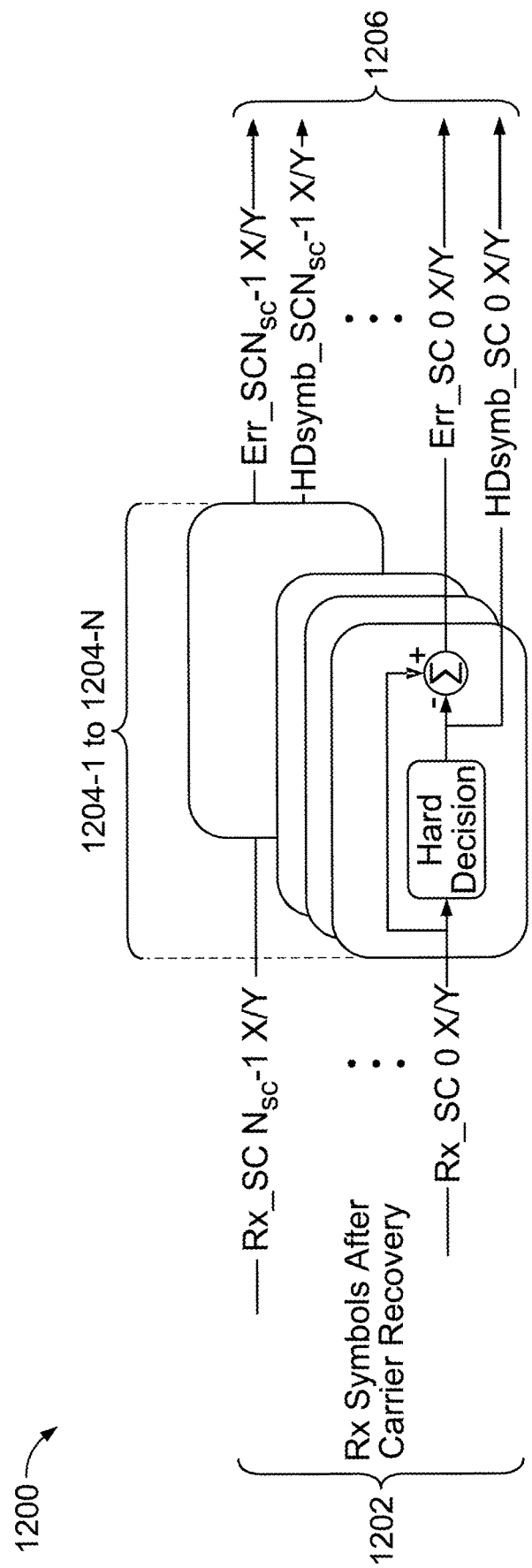
FIG. 12 is a block diagram of an example perturbative-based non-linear coding scheme for determining receiver symbols.

Returning back to FIG. 10, the RX DSP can receive the RX symbols 1002 after carrier recovery, such as the RX symbols output by the carrier recovery circuitry 616. These RX symbols can be provided to the $C_{mnij}$ NL Coefficient estimation 626. The coefficient estimation block can produce a hard decision on the input RX symbols 1002 in 1004. Specifically, the coefficient estimation block can perform hard decision based on an optimum maximum a posteriori (MAP) criterion and depends on the modulation alphabet used at the transmitter. For probabilistically shaped QAM modulation, the MAP decisions can depend on the signal-to-noise ratio of the Rx symbols as well as the prior distribution of the TX symbols. For uniform QAM modulation where all transmitted symbols are equally likely, the MAP decisions can reduce to a maximum likelihood (ML) criterion which, for an AWGN channel, includes deciding bits values based on the closest constellation point in Euclidean distance to the Rx symbol. FIG. 12 illustrates a more detailed process of the per subcarrier decision and error calculation 1004 in the coefficient estimation algorithm.

For example, FIG. 12 can illustrate the details of the per-subcarrier decision and error calculation block 1004 in a block diagram 1200 format. The block diagram 1200 illustrates RX symbols 1202 after carrier recovery, which are provided to multiple hard-decision blocks 1204-1 to 1204-N. More specifically, the number of hard-decision blocks 1204-1 to 1204-N can correspond to the $N_{sc}$ or the number of subcarriers utilized in the system. As shown, the RX symbols 1202 can range from Rx_SC ($N_{sc}$−1) to Rx_SC(0). Said another way, the system 1200 can process $N_{sc}$ Rx symbol subcarriers. The NLC processor can perform the hard decisions functions 1204-1 to 1204-N for each of the subcarrier symbols 1202 to decide with high confidence whether each symbol is either a 0 or 1.

In response to calculating the bits using each of the respective hard decision functions 1204-1 to 1204-N, the hard decision functions 1204-1 to 1204-N can calculate an error signal per subcarrier per polarization. The hard decision functions 1204-1 to 1204-N can calculate the error signal for each respective subcarrier on the x-polarization is calculated using the following equation:

$$e_{l,x}[k] = r_{l,x}[k] - |r_{l,x}[k]|_D \tag{12}$$

In the equation 12 above, the $r_{l,x}[k]$ can denote the received symbol on x-polarization of subcarrier k at time t=lT and $|r_{l,x}[k]|_D$ denotes its hard-decision. The output 1206 of each hard-decision function 1204-1 to 1204-N includes (i) an error symbol and (ii) the hard decision symbol. The output 1206 can be provided to the processing block 1006 in FIG. 10, where the NLC processor evaluates the triplet streams for each signal subcarrier k on x/y polarization.

Moreover, the idea behind the coefficient estimation algorithm is explained by noting that the error signal $e_{l,x}[k]$ calculated in equation 12 contains two contributions in the DSP chain. In some examples, one contribution includes noise can be caused by ASE noise, which can be modeled as circularly symmetric white Gaussian noise with equal variances on the in-phase and quadrature components. In some examples, a second contribution can be caused by non-linear distortion. Other noise contributions are also possible. In this manner, the complex error signal of equation 12 can be written as the following:

$$e_{l,X}[k] = \tag{13}$$
$$n_{l,X}[k] + \sum_{k,j} \sum_{m,n} C_{mnij}\left(A_{n+l,x}[i]A^*_{m+n+l,x}[j]A_{m+l,x}[v] + A_{n+l,y}[i]\right.$$
$$\left. A^*_{m+n+l,y}[j]A_{m+l,x}[v]\right)$$

In equation 13 above, $n_{l,x}[k]$ is the complex circularly symmetric AWGN from ASE noise. The second term is the total non-linear distortion that is identical to the perturbation that was calculated above in equation 9 which the PNLC circuit aims to subtract from the symbols. The non-linear distortion arises from the signal interacting with the non-linear fiber medium. Specifically, a product of the signal with itself at different time instants while traveling along the non-linear fiber medium can cause this distortion. Said another way, the second half of equation 13 above, which matches to equation 9, corresponds to the perturbation the PNLC processor seeks to determine and subtract from each of the symbols. In some implementations, in the pre-compensation, the second half of equation 13 can be subtracted from the symbols prior to transmission in the TX DSP. In some implementations, in the post-compensation, the second half of equation 13 can be subtracted from the received symbols in the RX DSP.

In equation 13, the decision errors can be ignored and the non-linear noises due to ASE-ASE or signal-ASE beating along the optical fiber are also ignored. The remaining operation is to estimate each non-linear coefficients in the double summation in the second term of equation 13. Returning back to FIG. 10, the next operation can include evaluating the triplet streams for each signal subcarrier k on x/y polarizations 1006. For example, to estimate $C_{m,n,i,j}[k]$, then the NLC processor can multiply the error signal $e_{l,x}[k]$ by the triplet corresponding to the coefficient to be estimated. For example, the NLC processor can multiply the triplet–$(A_{n+l,x}[i]A^*_{m+n+l,x}[j]A_{m+l,x}[v]+A_{n+l,y}[i]A^*_{m+n+l,y}[j]A_{m+l,x}[v])$, where $f_V=f_J-f_I+f_K$, and then can average the resultant value over time. More specifically, the resultant estimate can be defined by the following equation:

$$\hat{C}_{M,N,I,J} = \frac{1}{RMS^2_{M,N,I,J}} E\{e_{l,x}[k] * \qquad(14)$$

$$(A_{n+l,x}[I]A^*_{m+n+l,x}[J]A_{m+l,x}[V] + A_{n+l,y}[I]A^*_{m+n+l,y}[J]A_{m+l,x}[V])\}$$

In equation 14, E{•} can denote average over discrete time l, and the $RMS_{M,N,I,J}^2$ can denote the square of the RMS value of the triplet to be multiplied by. The estimator in equation 14 can indicate that the specific triplet to be multiplied by the error signal is uncorrelated with other triplets at different time lags or different subcarriers, i.e., for n≠N, m≠M, i≠I, j≠J. This means that after averaging over time, all other terms other than the one term containing this exact triplet at n=N, m=M, i=I, j=J (and hence $C_{M,N,I,J}[k]$) can cancel out. In addition, the AWGN term averaged over many symbols in time can cancel out.

Figure 13:
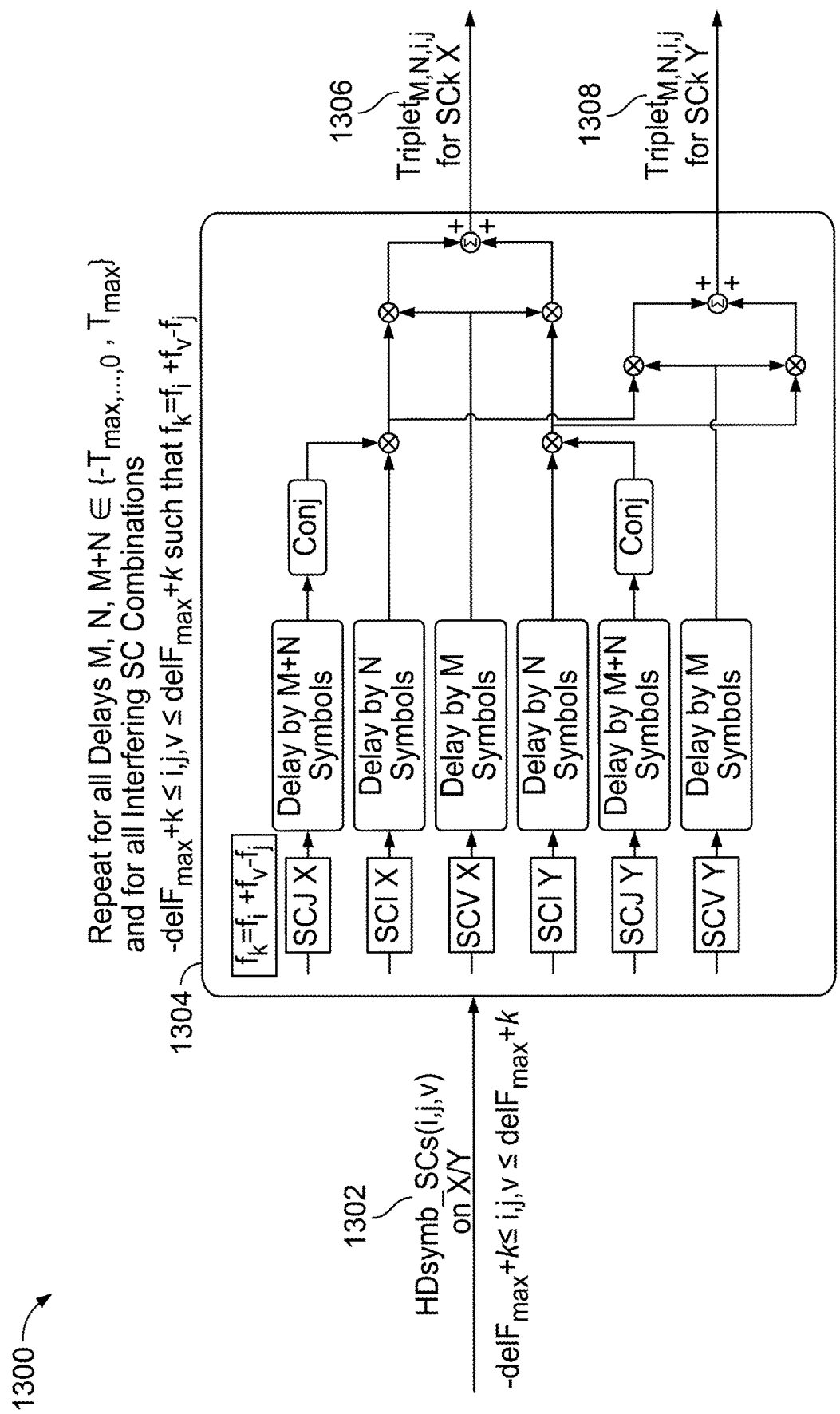
FIG. 13 is a block diagram of an example perturbative-based non-linear coding scheme for determining triplets for each subcarrier.
Figure 14:
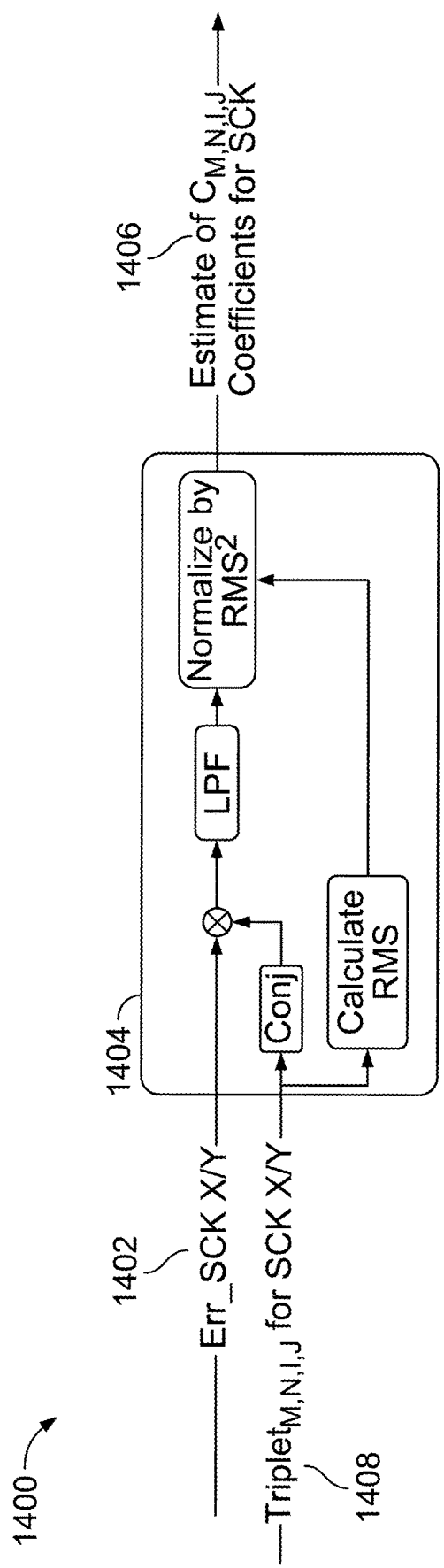
FIG. 14 is a block diagram of an example perturbative-based non-linear coding scheme for estimating non-linear coefficients using triplets for each subcarrier.

Both FIGS. 13 and 14 illustrate detailed block diagrams of evaluating a certain triplet using the hard decisions obtained from the processing block 1004 and then correlating the conjugate of the evaluated triplet with the error signal to obtain the estimate of the NL coefficients from the processing block 1008. More specifically, the calculation performed in the processing block 1008 can be defined by equation 14 above.

For example, as illustrated in FIG. 13, the hard decision symbols can be provided as inputs to the processing block 1304. The processing block 1304 can calculate the triplets 1306 for the subcarrier k in the X polarization and the triplets 1308 for the subcarrier k by multiplying the symbols from three subcarriers (i,j,v) at different time instants (lags). For example, the resultant triplet value can be determined with the following equation–$(A_{n+l,x}[i]A^*_{m+n+l,x}[j]A_{m+l,x}[v]+A_{n+l,y}[i]A^*_{m+n+l,y}[j]A_{m+l,x}[v])$. The processing block 1304 can perform this calculation for each interfering subcarrier combinations to produce the different triplet values 1306 and 1308.

In response to calculating the triplet value for each subcarrier, as shown in FIG. 14, the processing block 1404 can estimate the coefficient value using equation 14 above. Specifically, processing block 1404 can perform equation 14 on the error signal and the corresponding triple signal for each subcarrier. The result of the equation 14 can be provided as coefficient estimates 1406. The coefficient estimates can be provided to the transmit DSP for the pre-compensation or used in the receive DSP for post-compensation.

Figure 19:
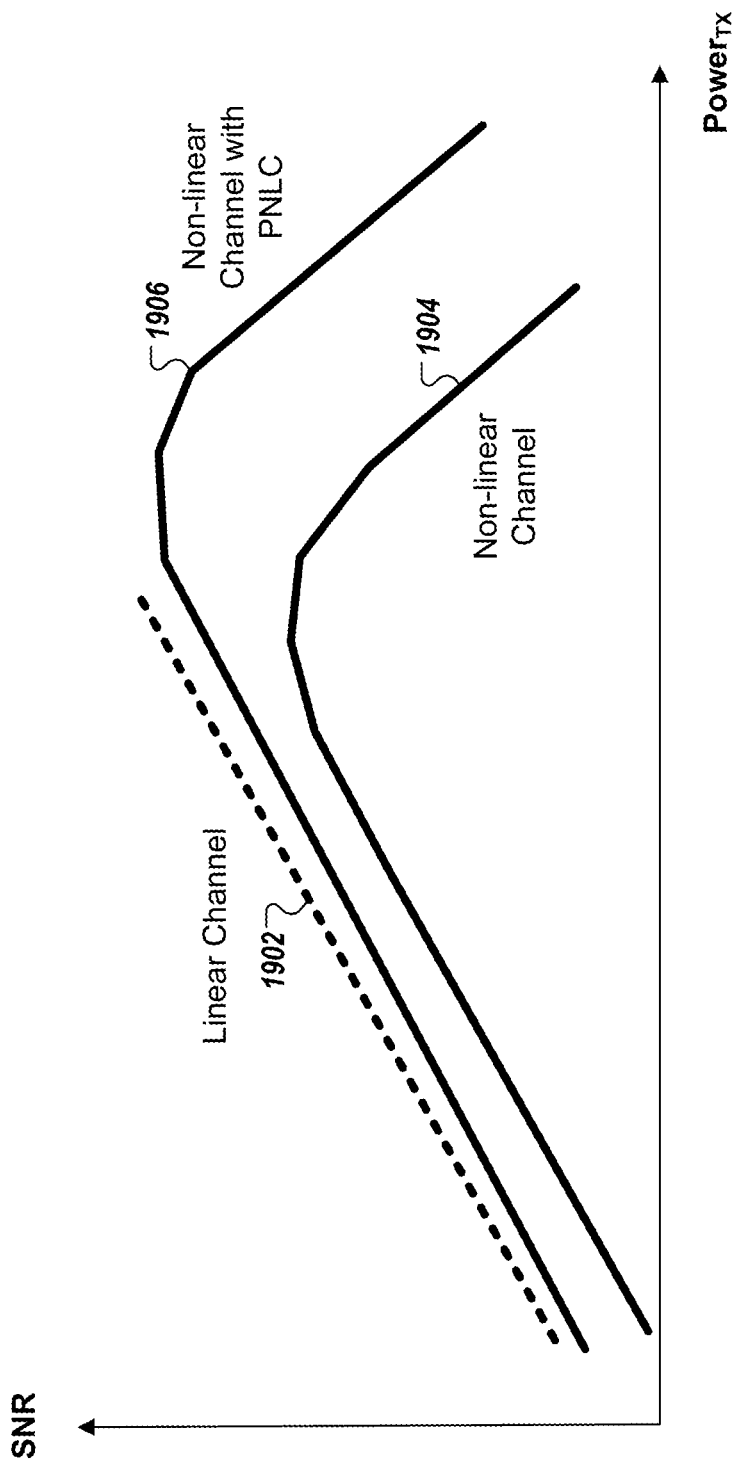
FIG. 19 is a graph of an example signal-to-noise ratio (SNR) against transmit power for different channel configurations.

FIG. 19 is a graph 1900 of an example signal-to-noise ratio (SNR) against transmit power for different channel configurations. The graph 1900 illustrates SNR against transmit power for three different channel responses. The first channel response 1902 represents a linear channel. The second channel response 1904 represents a non-linear channel. The third channel response 1906 represents a non-linear channel with PNLC applied at a receiver and/or a transmitter.

In the first channel response 1902, as the launch power or the transmit power increases, the SNR increases linearly at the receiver. In the second channel response 1904, as the launch power or the transmit power increases, the SNR at the receiver increases until a particular transmit power is reached. Once the particular transmit power has been reached, the SNR can steadily begin to drop in value as the transmit power increases. In the third channel response 1906, as the launch power or the transmit power increases, the SNR at the receiver increases until a particular transmit power is reached. However, for the third channel response 1906, the point at which the SNR and corresponding transmit power begin to decrease is greater than the point where the SNR and corresponding transmit power begin to decrease for the second channel response 1904 Accordingly, a higher SNR at the receiver and a corresponding higher transmit power at the transmitter can be achieved in a non-linear channel when PNLC is applied in a pre-compensation method and/or a post-compensation.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A receiver comprising:
a detector circuit operable to receive a first optical signal over a first optical link, the first optical signal carrying first data;
a carrier recovery estimation circuit operable to generate compensated data by correcting errors in the first data; and
a non-linear coefficient estimation circuit operable to:
(i) receive the compensated data; and
(ii) estimate one or more non-linear coefficients by:
determining, using the compensated data, hard symbol values based on hard decision functions;
evaluating, using the hard symbol values and for each subcarrier of a plurality of subcarriers, a plurality of triplet symbol values for each subcarrier of the plurality of subcarriers; and
estimating, using each triplet symbol value of the plurality of triplet symbol values, the one or more non-linear coefficients using (i) a complex conjugate of the triplet symbol value, (ii) root mean square of the triplet symbol value, (iii) low pass filtering the complex conjugate of the triplet symbol value with an error signal, and (iv) normalizing the low pass filtered value with a square of the root mean square of the triplet symbol value,
wherein information indicative of the one or more estimated non-linear coefficients is transmitted over a second optical link included in an optical network to a transmitter configured to output a second optical signal that is transmitted based, at least in part, on the one or more estimated non-linear coefficients, and
wherein the second optical signal is received by the receiver.

2. The receiver of claim 1, wherein the first optical signal comprises a plurality of subcarriers and a bandwidth of the plurality of subcarriers corresponds to a bandwidth of the optical link.

3. The receiver of claim 1, wherein the error signal comprises amplified spontaneous emission (ASE) noise present in the optical link and a non-linear distortion occurring during transmission of the first optical signal on the optical link.

4. The receiver of claim 1, comprising a digital signal processor, and the digital signal processor comprises:
a lane-to-lane skew correction circuit operable to correct timing skews associated with digital samples received from one or more analog-to-digital converters (ADCs) in the receiver;
a lane-to-lane gain imbalance correction circuit operable to correct amplitude skews associated with the digital samples;
an interpolator operable to resample the corrected digital samples to a rate that matches a sampling rate of an receiver (RX) frontend post-compensation matched filtering and mux circuitry (FDEQ) circuit;
the RX FDEQ circuit operable to perform one or more post-compensation processes on the resampled digital samples to correct for chromatic dispersion;
a subcarrier skew circuit operable to correct a chromatic dispersion-induced group delay difference between each subcarrier of the plurality of subcarriers;
a time-domain adaptive equalizer (TDEQ) circuit operable to perform post compensation polarization mode dispersion to recover orthogonal symbols for each subcarrier of the plurality of subcarriers;
the carrier recovery estimation circuit;
a soft-decision demapper operable to demap one or more bits from the recovered orthogonal symbols; and
a forward error correction decoder operable to apply one or more forward error correction decoding algorithms on the demapped bits.

5. The receiver of claim 1, wherein second data carried by the second optical signal is processed according to (i) the one or more estimated non-linear coefficients applied by a transmitter to offset non-linear effects imparted by the optical link and (ii) the non-linear effects imparted by the optical link.

6. The receiver of claim 1, wherein the one or more non-line coefficients are based on impairments imparted on the generated compensated data by the optical link.

7. A transmitter comprising:
a digital signal processor operable to receive first data for transmission on a first optical link, the digital signal processor comprising:
a forward error correction encoder operable to apply one or more forward error correction encoding algorithms on a plurality of bits to be transmitted;
a bit-to-symbol mapper operable to map the encoded bits to one or more symbols depending on a modulation scheme for transmission;
a non-linear pre-compensation circuit operable to (i) receive one or more non-linear coefficients associated with a second optical link and (ii) adjust the first data based on the one or more non-linear coefficients to pre-compensate for non-linear effects imparted by the first optical link to an optical signal propagating on the first optical link and carrying the first data;
a subcarrier skew circuit operable to skew the adjusted first data in time to pre-compensate for a fiber chromatic dispersion applied on the first optical link;
a transmitter frontend pre-compensation pulse shaping and subcarrier muxing (TX FDEQ) circuit operable to process the skewed data by performing pre-compensation of chromatic-dispersion induced group delay between spectral components of the skewed data;
a lane-to-lane skew correction circuit operable to correct the pre-compensated data for timing skews;
a lane-to-lane gain imbalance correction operable to correct the pre-compensated data for amplitude skews;
an interpolator operable to resample the pre-compensated data to a rate that matches a sampling rate of one or more digital-to-analog converters (DACs) on the transmitter; and
wherein the transmitter is operable to transmit the optical signal on the first optical link.

8. The transmitter of claim 7, wherein the one or more DACs are configured to provide the first data to a polarization beam combiner to cause the polarization beam combiner to output the first data to an external receiver over the first optical link.

9. The transmitter of claim 7, wherein the non-linear pre-compensation circuit is operable to adjust the first data for transmitting using the one or more non-linear coefficients to pre-compensate for non-linear effects imparted by the second optical link further comprises:
the non-linear pre-compensation circuit is operable to:
receive the one or more symbols from the bit-to-symbol mapper;
evaluate, using the one or more symbols, a plurality of triplet streams for each subcarrier of a plurality of subcarriers;

multiply each triplet stream of the plurality of triplet streams by the one or more non-linear coefficients;

generate a total perturbation value by summing each of the triplet streams multiplied by the one or more non-linear coefficients; and generate the adjusted first data by subtracting the total perturbation value from each of the one or more symbols received from the bit-to-symbol mapper.

10. The transmitter of claim 7, wherein the first optical link connects the transmitter and an external receiver.

11. The transmitter of claim 10, wherein the second optical link is a back-channel separate from the first optical link and the back-channel connects the non-linear pre-compensation circuit and the external receiver.

12. A transceiver comprising:
a receiver comprising:
    a detector circuit operable to receive a first optical signal over a first optical link, the first optical signal carrying first data;
    a carrier recovery estimation circuit operable to generate compensated data by correcting errors in the first data;
    a non-linear coefficient estimation circuit operable to:
        (i) receive the compensated data; and
        (ii) estimate one or more non-linear coefficients by:
            determining, using the compensated data, hard symbol values based on hard decision functions,
            evaluating, using the hard symbol values and for each subcarrier of a plurality of subcarriers, a plurality of triplet symbol values for each subcarrier of the plurality of subcarriers; and
            estimating, using each triplet symbol value of the plurality of triplet symbol values, the one or more non-linear coefficients using (i) a complex conjugate of the triplet symbol value, (ii) root mean square of the triplet symbol value, (iii) low pass filtering the complex conjugate of the triplet symbol value with an error signal, and (iv) normalizing the low pass filtered value with a square of the root mean square of the triplet symbol value,
    wherein information indicative of the one or more estimated non-linear coefficients are provided to a first transmitter; and the first transmitter operable to transmit the information indicative of the one or more estimated non-linear coefficients over a second optical link included in an optical network to a second transmitter configured to output a second optical signal that is transmitted based, at least in part, on the one or more estimated non-linear coefficients, and wherein the second optical signal is received by the receiver.

13. The transceiver of claim 12, wherein the first data comprises a plurality of subcarriers and a bandwidth of the plurality of subcarriers corresponds to a bandwidth of the optical link.

14. The transceiver of claim 12, wherein the non-linear coefficient estimation circuit enables the transceiver to increase an SNR value for receiving the first optical signal.

15. The transceiver of claim 12, comprising a digital signal processor, and the digital signal processor comprises:
    a lane-to-lane skew correction circuit operable to correct timing skews associated with digital samples received from one or more analog-to-digital converters (ADCs) in the receiver;
    a lane-to-lane gain imbalance correction circuit operable to correct amplitude skews associated with the digital samples;
    an interpolator operable to resample the corrected digital samples to a rate that matches a sampling rate of an RX FDEQ circuit;
    the RX FDEQ circuit operable to perform one or more post-compensation processes on the resampled digital samples to correct for chromatic dispersion;
    a subcarrier skew circuit operable to correct a chromatic dispersion-induced group delay difference between each subcarrier of the plurality of subcarriers;
    a TDEQ circuit operable to perform post compensation polarization mode dispersion to recover orthogonal symbols for each subcarrier of the plurality of subcarriers;
    the carrier recovery estimation circuit;
    a soft-decision demapper operable to demap one or more bits from the recovered orthogonal symbols; and
    a forward error correction decoder operable to apply one or more forward error correction decoding algorithms on the demapped bits.

* * * * *